US012259688B2

(12) United States Patent
Graemiger et al.

(10) Patent No.: US 12,259,688 B2
(45) Date of Patent: Mar. 25, 2025

(54) DEVICE FOR DISPLAYING AN INDICATION OF TIME OR DERIVED FROM THE TIME AND INDEXING DEVICE

(71) Applicant: ROLEX SA, Geneva (CH)

(72) Inventors: Pierre-Alain Graemiger, Trélex (CH); Pierre Villaret, Villy-le-Pelloux (FR)

(73) Assignee: ROLEX SA, Geneva (CH)

( * ) Notice: Subject to any disclaimer, the term of this patent is extended or adjusted under 35 U.S.C. 154(b) by 819 days.

(21) Appl. No.: 17/246,582

(22) Filed: Apr. 30, 2021

(65) Prior Publication Data

US 2021/0341881 A1 Nov. 4, 2021

(30) Foreign Application Priority Data

May 1, 2020 (EP) .................................... 20172581

(51) Int. Cl.

*G04B 19/253* (2006.01)
*G04B 19/06* (2006.01)
*G04B 19/14* (2006.01)

(52) U.S. Cl.

CPC ............. *G04B 19/14* (2013.01); *G04B 19/06* (2013.01); *G04B 19/253* (2013.01)

(58) Field of Classification Search

CPC ........ G04B 19/06; G04B 19/14; G04B 19/24; G04B 19/253

See application file for complete search history.

(56) References Cited

U.S. PATENT DOCUMENTS 3,688,490 A 9/1972 Oki
3,713,287 A 1/1973 Vogt et al.
3,888,076 A 6/1975 Zaugg et al.
4,048,795 A 9/1977 Risi
7,102,962 B2 9/2006 Suzuki
7,110,326 B2 9/2006 Besse
7,706,214 B2 4/2010 Scheufele
8,750,080 B2 6/2014 Tran et al.
9,367,039 B2 6/2016 Carreno et al.
10,222,751 B2 3/2019 Robin
(Continued)

FOREIGN PATENT DOCUMENTS

CH 260353 A 3/1949
CH 310559 A 10/1955
(Continued)

OTHER PUBLICATIONS

European Search Report and Written Opinion dated Oct. 12, 2020 in priority application No. EP20172581; with English machine translation (total 9 pages).
(Continued)

*Primary Examiner* — Edwin A. Leon
*Assistant Examiner* — Jason M Collins
(74) *Attorney, Agent, or Firm* — Seckel IP, PLLC

(57) ABSTRACT

Jumper device (80) for a timepiece device (100) including at east one first arm (81) including a first beak (81*a*) for positioning a first mobile unit (10), at least one second arm (82) including a second beak (82*a*) for positioning a second mobile unit (20), an elastic element (84) for returning the first arm and the second arm to configurations positioning the first and second mobile units, and a lever (83; 83') interfaced between, on the one hand, the elastic return element, and on the other hand, the first and second arms.

28 Claims, 13 Drawing Sheets

(56) References Cited

U.S. PATENT DOCUMENTS

| | | | |
|---|---|---|---|
| 10,222,758 | B2 | 3/2019 | Graemiger |
| 10,437,198 | B2 | 10/2019 | La China et al. |
| 11,550,265 | B2 | 1/2023 | Fleury et al. |
| 2012/0195169 | A1 | 8/2012 | Courvoisier |
| 2013/0051183 | A1 | 2/2013 | Gabathuler et al. |
| 2013/0128706 | A1 | 5/2013 | Graf et al. |
| 2014/0160897 | A1 | 6/2014 | Gabathuler et al. |
| 2016/0048107 | A1 | 2/2016 | Carreno et al. |
| 2017/0153604 | A1 | 6/2017 | La China et al. |
| 2017/0185046 | A1 | 6/2017 | Graemiger |
| 2019/0129362 | A1 | 5/2019 | Fleury et al. |

FOREIGN PATENT DOCUMENTS

| | | | |
|---|---|---|---|
| CH | 528767 | A | 6/1972 |
| CH | 986270 | A4 | 6/1972 |
| CH | 532808 | A | 7/1972 |
| CH | 689601 | A5 | 6/1999 |
| CH | 690869 | A | 2/2001 |
| CH | 712309 | A2 | 10/2017 |
| CH | 713226 | A1 | 6/2018 |
| CH | 713334 | A2 | 6/2018 |
| CN | 102656527 | A | 9/2012 |
| CN | 102968042 | A | 3/2013 |
| CN | 103123454 | A | 5/2013 |
| CN | 105372978 | A | 3/2016 |
| CN | 106802545 | A | 6/2017 |
| CN | 107045277 | A | 8/2017 |
| CN | 109752942 | A | 5/2019 |
| EP | 1426836 | A1 | 6/2004 |
| EP | 2985660 | A1 | 2/2016 |
| EP | 3644130 | A1 | 4/2020 |
| FR | 2120056 | A1 | 8/1972 |
| JP | S42-4066 | Y | 3/1967 |
| JP | S49-10858 | Y | 3/1974 |
| JP | S50-67170 | A | 6/1975 |
| JP | S51-70670 | A | 6/1976 |
| JP | 2005-539213 | A | 12/2005 |
| JP | 2012-173160 | A | 9/2012 |
| JP | 2016-42085 | A | 3/2016 |
| JP | 2018-100970 | A | 6/2018 |
| WO | 9850829 | A1 | 11/1998 |

OTHER PUBLICATIONS

Office Action dated Jun. 26, 2023 in co-pending U.S. Appl. No. 17/246,579; with PTO892, without returned SB08 (total 8 pages).

European Search Report and Written Opinion dated Oct. 12, 2020 in priority application No. EP20172579 of co-pending U.S. Appl. No. 17/246,579; with English machine translation (total 8 pages).

JP Office Action dated Feb. 4, 2025 in application No. JP 2021-077013, counterpart of co-pending U.S. Appl. No. 17/246,579, now U.S. Pat. No. 11,921,460 B2; with English machine translation (total 9 pages).

CN Office Action and Search Report dated Jan. 13, 2025 in application No. CN 202110483985.8, counterpart of co-pending U.S. Appl. No. 17/246,579, now U.S. Pat. No. 11,921,460 B2; with English machine translation (total 11 pages).

CN Office Action and Search Report dated Jan. 13, 2025 in counterpart application No. CN 202110481623.5; with English machine translation (total 13 pages) (note: U.S. Pat. No. 3,713,287, D1, U.S. Pat. No. 3,688,490, D4, U.S. Pat. No. 4,048,795, D5 cited in the CN Search Report (U.S. Pat. No. 4,048,795 is also D1 cited in the CN Office Action) are not listed in this IDS since they are already of record).

JP Office Action dated Feb. 4, 2025 in counterpart application No. JP 2021-077009; with English machine translation (total 11 pages),

DEVICE FOR DISPLAYING AN INDICATION OF TIME OR DERIVED FROM THE TIME AND INDEXING DEVICE

CROSS-REFERENCE TO RELATED APPLICATION

This application claims priority of European patent application No. EP20172581.9 filed May 1, 2020, the content of which is hereby incorporated by reference herein in its entirety.

BACKGROUND ART

The invention concerns a display for displaying an indication of the time or derived from the time. The invention also concerns a jumper or indexing device. The invention also concerns a timepiece movement including this kind of display device and/or this kind of jumper or indexing device. The invention further concerns a timepiece including this kind of display device and/or this kind of jumper or indexing device, or this kind of timepiece movement. The invention finally concerns a method of operating this kind of display device or this kind of timepiece movement or this kind of timepiece.

Prior art "grande date" mechanisms systematically employ a command wheel or a disk with 31 teeth, or a command wheel or a disk effecting a complete rotation in 31 steps, that are bulky and that consequently do not facilitate the incorporation of this kind of mechanism into a timepiece movement. Moreover, the sequencing of the command device for driving the tens and units disks is often complicated and offers little freedom of choice as to the positions of the mobile units in the plane.

All of the identified solutions employ either a command mobile unit or a disk with 31 teeth. By way of example, the documents CH310559 and WO9850829 describe the two main driving concepts known today for "grande date" mechanisms.

The document CH310559 describes the arrangement of a first command mobile unit driving a first display mobile unit for the units and a second display mobile unit for the tens. The two display mobile units are disposed side by side. The command mobile advances by one step every 24 hours and effects a complete rotation in 31 steps. The command mobile includes three toothings distributed on three distinct levels. A first toothing is provided to drive itself, a second toothing comprising 30 teeth is provided to drive the units display mobile unit, and a third toothing comprising 4 teeth is provided for driving the tens display mobile unit. The arrangement on three distinct levels and employing a command mobile unit sequencing the jumps over 31 steps render this solution particularly bulky and difficult to incorporate in a timepiece movement.

The second document WO9850829 describes the use of a command disk advancing one step every 24 hours and driving a first display mobile unit for the units and second display mobile unit for the tens. These two display mobiles units are disposed side by side. The command disk includes two toothings disposed at two distinct levels. The first toothing comprises 31 teeth, 30 of which are active for driving the units display mobile unit. The second toothing comprises 31 teeth, 4 of which are active for driving the tens display mobile unit. The overall size in the plane of this kind of disk is very large. It is similar to a date disk, which leaves virtually no freedom of choice as to the disposition of the two display mobile units in a timepiece movement. Moreover, employing a disk sequencing the jumps over 31 steps renders this solution particularly difficult for incorporating in a timepiece movement.

As described above, a "grande date" mechanism generally includes two display mobiles for displaying the date, a first for displaying the units and a second for displaying the tens. Each of these two display mobiles necessitates an angular position indexing device respectively enabling indexing of the units and tens digits in the window. By "indexing" a mobile is preferably meant maintaining a mobile in a particular angular position from a finite number of angular positions of that mobile, the positions being separated from one another by angles, in particular separated from one another by a fixed angle.

The problem with this type of "grande date" mechanism is that, when changing the date, the energy consumption of the movement depends in particular on the date changed. In fact, according to the sequencing of the mechanism for displaying the date, it is necessary to drive one or more "grande date" display mobiles. With a conventional mobiles indexing device, the movement must overcome one or simultaneously two jumpers or levers each constituting an indexing device, which generates a consumption of energy liable to vary as a function of the date changed. When the movement has to overcome two jumpers or levers, there may be less energy available for the regulating unit which consequently may generate possible losses of amplitude at the level of that same regulating unit. These amplitude variations must be as small as possible in order to have the most optimum possible chronometric performance.

The various prior art documents identified describe mobiles indexing devices that employ two levers that are incompatible with a "grande date" mechanism and/or do not propose any solution for having an equivalent or substantially equivalent energy consumption whether there are one or several indexing levers to be actuated.

The document CH986270 describes a calendar including a date indicator and a day of the week indicator. These mobiles indexing devices include a lever with two beaks fastened to one another for positioning the two indicators, an elastic return element and an eccentric fixedly attached to the lever. The eccentric enables adjustment of the relative position of the two beaks and consequently adjustment of the angular indexing position of the two indicators. This solution cannot be employed for indexing a "grande date" mechanism because a degree of freedom between the two beaks is necessary for the latter to be able to function independently of one another.

The document U.S. Pat. No. 4,048,795 describes a calendar including a mobiles indexing device for positioning an indicator of the date and an indicator of the day of the week including a single lever with two beaks and two elastic return elements. In order to offer the indexing device an additional degree of freedom, the lever further includes a slot adapted to cooperate with a pin fixedly attached to the frame of the movement, thereby constituting a slide connection. Although the beaks are fixedly attached to only one lever, this additional degree of freedom allows the indicators to be able to function independently. In fact, thanks to this slide connection, when only one of the two indicators is actuated, for example during a first operation to adjust the calendar, the beak cooperating with the other indicator remains in the teeth of the latter and serves as a pivot for the lever. In this case, only one of the two elastic return elements is loaded. Operation is similar when it is the other indicator that is actuated, for example during a second operation to adjust the calendar. On the other hand, when the two indicators are actuated simultaneously during conventional operation of the calendar, the lever pivots around the pin and both the elastic return elements of the lever are loaded. This indexing device offers no solution enabling actuation of one and the same return element when the two indicators are actuated simultaneously. Moreover, it does not enable an equivalent or substantially equivalent energy consumption to be obtained whatever the number of display mobiles actuated.

The document FR2120056 discloses a calendar including a mobiles indexing device including a lever with two beaks that can be actuated independently of one another. This mobiles indexing device is described as including at least one beak intended to index the date indicator or the day of the week indicator and elastic parts oriented in two directions allowing elastic return of the device. With this kind of device the arming of the elastic parts of the mobiles indexing device, and consequently the energy consumption, depend on the number of beaks actuated. This solution is therefore not the optimum solution.

SUMMARY OF THE INVENTION

In accordance with a first aspect, the aim of the invention is to provide a device for displaying an indication of the time or derived from the time making it possible to remedy the drawbacks mentioned above and to improve the known prior art devices. In particular, the invention proposes a device for displaying an indication of the time or derived from the time providing great suppleness or flexibility in the arrangement of a display mechanism and making it possible to obtain a structure with a very small overall size in the plane and offering very secure operation.

In accordance with a second aspect, the aim of the invention is to provide a jumper or position indexing device making it possible to remedy the drawbacks mentioned above and to improve the known prior art devices. In particular, the invention proposes a jumper or position indexing device having a simple structure enabling use of two levers functioning independently of one another and moreover an equivalent or substantially equivalent restitution force on an elastic return element to be obtained whatever the number of levers or of beaks to actuate.

In Accordance with the First Aspect of the Invention, a Display Device is Defined by the Following Propositions.

1. Device 100 for display of an indication of the time or derived from the time including:
   - a first display mobile unit 10 including a first toothing 11*b*, a second toothing 11*c* and a first disk 12 carrying digits 13 intended to indicate the units of the indication of the time or derived from the time,
   - a second display mobile unit 20 including a third toothing 21*b*, a fourth toothing 21*c* and a second disk 22 carrying digits 23 intended to indicate the tens of the indication of the time or derived from the time, and
   - a mechanism 90 for driving the first and second mobile units, the mechanism including:
     - a first command mobile unit 30 including a fifth toothing 30*a* adapted to cooperate by obstacle, in particular by meshing, with the first toothing and the third toothing, and
     - a second command mobile unit 40 including a sixth toothing 40*a* adapted to cooperate by obstacle, in particular by meshing, with the second toothing and the fourth toothing.
2. Display device according to proposition 1, characterized in that the first, third and fifth toothings have substantially the same first primitive diameter and/or in that the second, fourth and sixth toothings have substantially the same second primitive diameter.
3. Device according to proposition 2, characterized in that the first and second primitive diameters are equal or substantially equal.
4. Display device according to any one of propositions 1 to 3, characterized in that the first command mobile unit 30 and the second command mobile unit 40 are arranged coaxially on an axis A3.
5. Display device according to any one of propositions 1 to 4, characterized in that the drive mechanism 90 includes a drive wheel 60 including a seventh toothing 61 adapted to drive the first command mobile unit directly or indirectly.
6. Display device according to any one of propositions 1 to 5, characterized in that the second command mobile unit is adapted to be driven by the first display mobile unit and/or by the second display mobile unit.
7. Display device according to any one of propositions 1 to 6, characterized in that the drive mechanism 90 includes an intermediate mobile unit 50 cooperating by obstacle, in particular by meshing, with the seventh toothing of the drive wheel 60 and with the fifth toothing of the first command mobile unit 30 and/or in that the drive mechanism 90 includes a correction mobile unit 70 adapted to actuate the fifth toothing of the first mobile unit 30 directly or indirectly.
8. Display device according to any one of propositions 1 to 7, characterized in that the drive mechanism 90 is of the instantaneous jump type or of the semi-instantaneous jump type or of the trailing type.
9. Display device according to any one of propositions 1 to 8, characterized in that the first toothing 11*b* comprises 9 teeth, the second toothing 11*c* comprises 2 teeth, the third toothing 21*b* comprises 4 teeth and the fourth toothing 21*c* comprises 6 teeth.
10. Display device according to any one of propositions 1 to 8, characterized in that the first toothing 11*b* comprises 9 teeth, the second toothing 11*c* comprises 2 teeth, the third toothing 21*b* comprises 7 teeth and the fourth toothing 21*c* comprises 8 teeth.
11. Display device according to any one of propositions 1 to 10, characterized in that the first disk includes the following series of digits "0, 1, 2, 3, 4, 5, 6, 7, 8, 9" and/or in that the second disk includes the following series of digits "0, 0, 1, 1, 1, 2, 2, 2, 3, 3".
12. Display device according to any one of propositions 1 to 11, characterized in that the device for displaying an indication of the time or derived from the time is a date display device, in particular of "grande date" type, the first disk being a units disk and the second disk being a tens disk.

In accordance with the first aspect of the invention, a timepiece movement is defined by the following proposition.

13. Timepiece movement 110 including a device 100 according to any one of propositions 1 to 12.

In accordance with the first aspect of the invention, a timepiece is defined by the following proposition.

14. Timepiece 120, in particular a watch, in particular a wristwatch, including a device 100 according to any one of propositions 1 to 12 and/or a timepiece movement 110 as claimed in proposition 13.

In accordance with the first aspect of the invention, a method of operating a display device is defined by the following proposition.

15. Method of operating a device 100 according to any one of propositions 1 to 12 or a timepiece movement 110 according to proposition 13 or a timepiece 120 according to proposition 14, characterized in that it includes:
   a step of the first command mobile unit 30 driving the first display mobile unit 10, and/or
   simultaneously, a step of the first command mobile unit 30 driving the first display mobile unit 10 and a step of the first display mobile unit 10 driving the second display mobile unit 20 via the second command mobile unit 40, and/or
   a step of the first command mobile unit 30 driving the second display mobile unit 20, and/or
   simultaneously, a step of the first command mobile unit 30 driving the second display mobile unit 20 and a step of the second display mobile unit 20 driving the first display mobile unit 10 via the second command mobile unit 40.

In accordance with the second aspect of the invention, a jumper device is defined by the following propositions.

16. Jumper device 80 for a timepiece device 100 including:
   at least one first arm 81 including a first beak 81*a* for positioning a first mobile unit 10,
   at least one second arm 82 including a second beak 82*a* for positioning a second mobile unit 20,
   an elastic element 84 for returning the first arm and the second arm to configurations positioning the first and second mobile units, and
   a lever 83; 83' interfaced between:
      on the one hand, the elastic return element, and
      on the other hand, the first and second arms.
17. Device according to proposition 16, characterized in that the device is a device for indexing the angular position of a first mobile unit 10 mobile in rotation and of a second mobile unit 20 mobile in rotation.
18. Device according to proposition 16 or 17, characterized in that the device includes a frame 99, in that the first arm is mounted to pivot relative to the frame 99 and in that the second arm is mounted to pivot relative to the frame 99, the first and second arms being in particular mounted to pivot about the same axis A5.
19. Device according to any one of propositions 16 to 18, characterized in that the device includes a frame 99 and in that the lever 83; 83' is mounted to be mobile relative to the frame with:
   one degree of freedom in translation, and
   one degree of freedom in rotation.
20. Device according to any one of propositions 16 to 19, characterized in that the greatest dimension of the lever is at least twice, or even three times, less than the greatest dimension of the first arm or the greatest dimension of the second arm.
21. Device according to any one of propositions 16 to 20, characterized in that the device includes a frame 99 and in that the device includes:
   a groove 85 on the lever, respectively on the frame, and
   a pin 86 produced on or fixed to the frame, respectively to the lever, the groove and the pin cooperating with one another to constitute a mechanical connection having the degrees of freedom in translation and in rotation.
22. Device according to any one of propositions 16 to 21, characterized in that the elastic return element 84 comprises a spring leaf.
23. Device according to any one of propositions 16 to 22, characterized in that the lever 83' or the elastic return element has a cam surface 89 adapted to arm the elastic return element 84 when the lever pivots in rotation.

In accordance with the second aspect of the invention, a display device is defined by the following propositions.

24. Date display device 100, in particular "grande date" display device, including a jumper device according to any one of propositions 16 to 23.
25. Date display device 100 according to proposition 24, including a first mobile unit 10 for displaying units and a second mobile unit 20 for displaying tens.

In accordance with the second aspect of the invention, a timepiece movement is defined by the following proposition.

26. Timepiece movement 110 including a device according to any one of propositions 16 to 25.

In Accordance with the Second Aspect of the Invention, a Timepiece is Defined by the Following Proposition.

27. Timepiece 120, in particular watch, in particular wristwatch, including a device according to any one of propositions 16 to 25 and/or a timepiece movement 110 according to proposition 26.

In accordance with the second aspect of the invention, a method of operating a device is defined by the following propositions.

28. Method of operating a device 80, 100 according to any one of propositions 16 to 25 or a timepiece movement 110 according to proposition 26 or a timepiece 120 according to proposition 27, characterized in that it includes:
   a step of moving the first arm and/or the second arm by the effect of the movement of the first mobile unit 10 and/or of the second mobile unit 20 and a step of arming the elastic return element 84 by the effect of a movement of the lever 83; 83', and
   a step of restituting of the elastic return element 84 causing driving in rotation of the first mobile unit 10 and/or the second mobile unit 20 by means of the lever 83; 83' and the first arm and/or the second arm.
29. Method according to proposition 28, characterized in that the arming step has the same intensity in at least two of the following situations:
   arming is brought about by a movement of the first mobile unit,
   arming is brought about by a movement of the second mobile unit,
   arming is brought about by movement of the first and second mobile units.

Failing technical or logical incompatibility, all combinations of features of the first and second aspects can be carried out.

BRIEF DESCRIPTION OF THE DRAWINGS

The appended drawings represent two embodiments of a timepiece by way of example.

FIGS. 11 to 13 represent explanatory views of the operation of the first embodiment of the indexing device:

FIGS. 14 to 16 represent explanatory views of the operation of a second embodiment of the indexing device:

Detailed Description of Particular Embodiments

Figure 1:
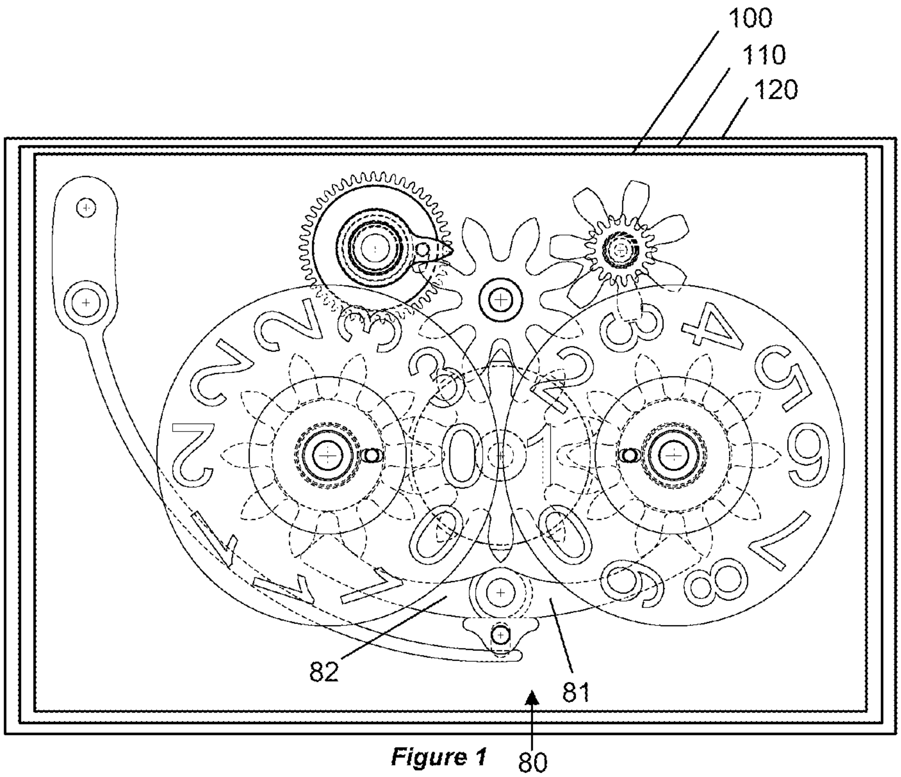
FIG. 1 represents a first embodiment of a timepiece.

A first embodiment of a timepiece 120 is described hereinafter with reference to FIGS. 1 to 8.

The timepiece 120 is for example a watch, in particular a wristwatch.

The timepiece 120 includes a timepiece movement 110. The timepiece movement is intended to be mounted in a timepiece case in order to protect it from the external environment.

The Timepiece Movement 110 May be an Electronic Movement or a Mechanical Movement, in Particular an Automatic Movement.

The timepiece movement includes a device 100 for displaying an indication of the time or derived from the time. The indication of the time or derived from the time is preferably an indication of the date. However, the indication may be of any other kind, in particular a numerical indication of two digits or more such as an indication of the year or an indication of the month or an indication of the week or an indication of the hour or an indication of the minute or an indication of the second.

In this first embodiment the display device is for example a device for displaying dates of “grande date” type.

The Device 100 for Displaying an Indication of the Time or Derived from the Time Includes:

- a first display mobile unit 10 including a first toothing 11*b*, a second toothing 11*c* and a first disk 12 carrying digits 13 intended to indicate the units of the indication of the time or derived from the time,
- a second display mobile unit 20 including a third toothing 21*b*, a fourth toothing 21*c* and a second disk 22 carrying digits 23 intended to indicate the tens of the indication of the time or derived from the time, and
- a mechanism 90 for driving the first and second mobile units.

The Drive Mechanism 90 Includes:

- a first command mobile unit 30 including a fifth toothing 30*a* adapted to cooperate by obstacle, in particular by meshing, with the first toothing and the third toothing, and
- a second command mobile unit 40 including a sixth toothing 40*a* adapted to cooperate by obstacle, in particular by meshing, with the second toothing and the fourth toothing.

The first display mobile unit 10 pivots about a first axis A1. The second display mobile unit 20 pivots about a second axis A2. The first and second axes are preferably parallel or substantially parallel. The first and second mobile units are preferably disposed side by side so as to position in the vicinity of one another a units digit of the first mobile unit and a tens digit of the second mobile unit to indicate a value or information such as a monthly date value. The device may include a marker, such as a window produced in a dial or as a plate of a color contrasting with that of the numbers 13 and 23, respectively the disks 12 and 22, enabling an information reading zone to be indicated or defined.

The display device 100 further includes an indexing system 80 for the angular position of the first and second display mobile units. This system includes arms 81 and 82 respectively adapted to index angularly the first and second display mobile units, as described below.

The first display mobile unit 10 includes a first gear 11 including in particular the first toothing 11*b* and the second toothing 11*c*. The first toothing has nine teeth for example. The first toothing is for example a set of ten teeth equi-angularly distributed around the axis A1, one of the teeth of which has been removed or not formed. In other words, this is a set of ten teeth from which one tooth is missing. The second toothing 11*c* for example has two teeth. The second toothing is for example a set of ten teeth equi-angularly distributed around the axis A1, eight teeth of which have been removed or not formed. In other words, it is a set of ten teeth of which eight teeth are missing. The two teeth of the second toothing are preferably juxtaposed, that is to say that there exists no space left free by a missing tooth between the two teeth of the second toothing. These configurations of toothings with teeth missing are adapted to allow a particular sequence in driving the first mobile unit but also the second mobile unit as will be described below. The first and second toothings may be seen as constituting a single toothing with no missing teeth, one tooth being located on the first toothing at an angular location where a tooth is missing on the second toothing and one tooth being located on the second toothing at an angular location where a tooth is missing in the first toothing. Moreover, at least one tooth of the first toothing may equally be juxtaposed to a tooth of the second toothing.

The first disk 12 includes 10 units digits 0 to 9. These digits are represented on the units display disk 12.

Figure 3:
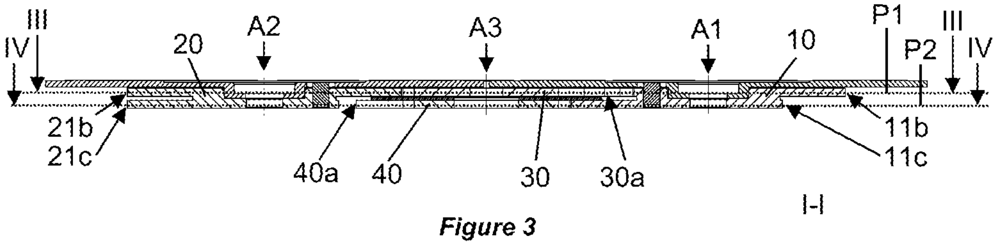
FIG. 3 is a view in section (on the plane I-I in FIG. 2) of the first embodiment of the device for displaying an indication of the time or derived from the time.

The first toothing 11*b* and the second toothing 11*c* are juxtaposed on two distinct levels respectively disposed in the planes P1 and P2 as represented in FIG. 3. The planes P1 and P2 are parallel to one another and distinct from one another. They are preferably perpendicular to the axis A1. The plane P1 therefore intersects the first toothing but does not intersect the second toothing. Likewise, the plane P2 intersects the second toothing but does not intersect the first toothing.

The first and second toothings are fixedly attached to one another in rotation about the axis A1. Thus one of the toothings is not able to turn through a given angle about the axis A1 without the other of the toothings also turning through that same given angle. For example, the first and second toothings are fixed to one another or connected by a built-in connection. Alternatively, the first and second toothings are in one piece or made as a single block or element.

The second display mobile unit 20 includes a second gear 21 including in particular the third toothing 21*b* and the fourth toothing 21*c*. The third toothing for example has four teeth. The third toothing for example consists of set of ten teeth equi-angularly distributed around the axis A2, of which six teeth have been removed or not formed. In other words, it is a set of ten teeth of which six teeth are missing. The four teeth of the third toothing are preferably distributed as follows: two juxtaposed teeth, a space left free by two missing teeth, one tooth, a space left free by two missing teeth, one tooth and a space left free by two missing teeth.

The fourth toothing 21*c* for example includes six teeth. The fourth toothing for example consists of a set of ten teeth equi-angularly distributed about the axis A2, of which four teeth have been removed or not formed. In other words, it is a set of ten teeth of which four teeth are missing. The six teeth of the fourth toothing are preferably distributed as follows: two juxtaposed teeth, a space left free by a missing tooth, two juxtaposed teeth, a space left free by a missing tooth, two juxtaposed teeth, a space left free by two missing teeth. The third and fourth toothings may be seen as constituting a single toothing with no missing teeth, one tooth being located on the third toothing at an angular location where a tooth is missing on the fourth toothing and one tooth being located on the fourth toothing at the angular location where a tooth is missing in the third toothing. Moreover, at least one tooth of the third toothing may equally be juxtaposed to at least one tooth of the fourth toothing.

These configurations of toothings with missing teeth are adapted to enable a particular sequencing in the driving of the second mobile unit but also of the first mobile unit, as will be explained below. In particular, the second command mobile unit is also adapted so as to be driven by the first display mobile unit and/or by the second display mobile unit.

The second disk 22 includes 10 tens digits 0 to 3. These digits are represented on the tens display disk 22. The digits are represented in the following sequence: 0, 0, 1, 1, 1, 2, 2, 2, 3, 3.

The third toothing 21*b* and the fourth toothing 21*c* are juxtaposed on two distinct levels respectively disposed in the planes P1 and P2, as represented in FIG. 3. The planes P1 and P2 are preferably perpendicular to the axis A2. Thus the plane P1 intersects the third toothing but does not intersect the fourth toothing. Likewise, the plane P2 intersects the fourth toothing but does not intersect the third toothing.

The third and fourth toothings are fixedly attached to one another in rotation about the axis A2. Thus one of the toothings is not able to turn through a given angle about the axis A2 without the other of the toothings also turning through that given angle. For example, the third and fourth toothings are fixed to one another or connected by a built-in connection. Alternatively, the third and fourth toothings are in one piece or made as a single block or element.

In addition to the first command mobile unit and the second command mobile unit, the drive mechanism 90 includes a drive wheel 60 including a seventh toothing 61 adapted to drive the first command mobile unit directly or indirectly.

In particular, the drive mechanism 90 may include an intermediate mobile unit 50 cooperating by obstacle, in particular by meshing, with the seventh toothing 61 of the drive wheel 60 and with the fifth toothing of the first command mobile unit 30. Thus the seventh toothing 61 is adapted to drive the first command mobile unit indirectly (via the intermediate mobile unit 50).

The drive mechanism 90 may be of the instantaneous jump type or of the semi-instantaneous jump type or of the trailing type.

The driving mechanism 90 is configured and/or arranged so as to cause the first command mobile unit to advance by one step every twenty four hours, that is to say to cause the rotation through one tenth of a turn of the first display mobile unit every twenty four hours.

As stated above, the first command mobile unit 30, via its fifth toothing 30*a*, enables driving of the first display mobile unit 10 and/or of the second display mobile unit 20, more particularly driving of the first toothing 11*b* and/or the third toothing 21*b*.

As stated above, the second command mobile unit 40, via its sixth toothing 40*a*, enables driving of the first display mobile unit 10 and/or of the second display mobile unit 20, more particularly driving of the second toothing 11*c* and/or of the fourth toothing 21*c*. Moreover, the second command mobile unit is driven by the first display mobile unit and/or by the second display mobile unit.

The first and second command mobile units 30 and 40 are for example coaxial relative to a third axis A3. The axis A3 is preferably parallel to the axes A1 and A2.

Figure 4:
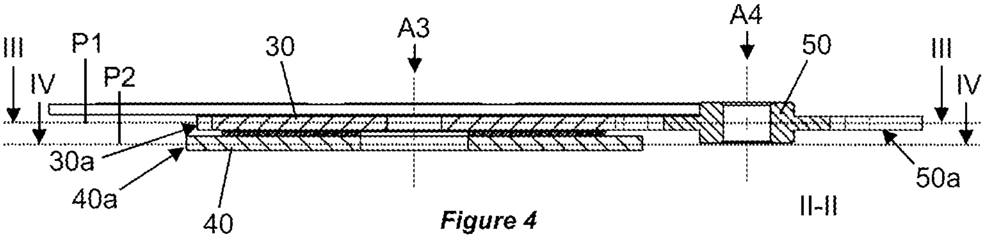
FIG. 4 is a view in section (on the plane II-II in FIG. 2) of the first embodiment of the device for displaying an indication of the time or derived from the time.

The fifth toothing 30*a* and the sixth toothing 40*a* are juxtaposed on two distinct levels respectively disposed in the planes P1 and P2 as represented in FIG. 4. The planes P1 and P2 are preferably perpendicular to the axis A3. Thus the plane P1 intersects the fifth toothing but does not intersect the sixth toothing. Likewise, the plane P2 intersects the sixth toothing but does not intersect the fifth toothing.

The first and second command mobile units 30 and 40 are mounted idly relative to one another. In other words, the first and second command mobile units are able to turn freely relative to one another.

The fifth and sixth toothings 30*a* and 40*a* each comprise 10 teeth for example. These toothings could have another number of teeth. However, the fifth and sixth toothings 30*a* and 40*a* advantageously have the same number of teeth.

The first and second toothings 11*b* and 21*b* disposed at the level of the first plane P1 are each adapted to cooperate with the fifth toothing 30*a* of the first command mobile unit 30, which is also arranged at the level of the first plane P1. This first command mobile unit 30, more particularly the fifth toothing 30*a*, is driven by one step every 24 hours.

The two display mobile units 10 and 20 are also driven by means of the sixth toothing 40*a* of the second command mobile unit 40, which is arranged at the level of the second plane P2, and which is adapted to cooperate with the toothings 11*c* and 21*c*. As a function of the sequencing of the date jumps, this second command mobile unit 40 can drive and/or be driven by the toothings 11*c* and 21*c*.

More particularly, byway of its toothing 50*a*, the drive mechanism 90 drives the fifth toothing 30*a* of the first command mobile unit 30 by one step every day, which in turn, according to the date, drives the first display mobile unit and/or the second display mobile unit 20 via the respective toothings 11*b*, 21*b*. Depending on the date, the toothing 40*a* of the second command mobile unit 40 may be driven by the first display mobile unit 10, more particularly by the toothing 11*c*, and/or by the second display mobile unit 20, more particularly by the toothing 21*c*. When it is driven, the second command mobile unit 40 can in turn drive the first display mobile unit 10 via the toothing 11*c* and/or the second display mobile unit 20 via the toothing 21*c*.

Figure 6:
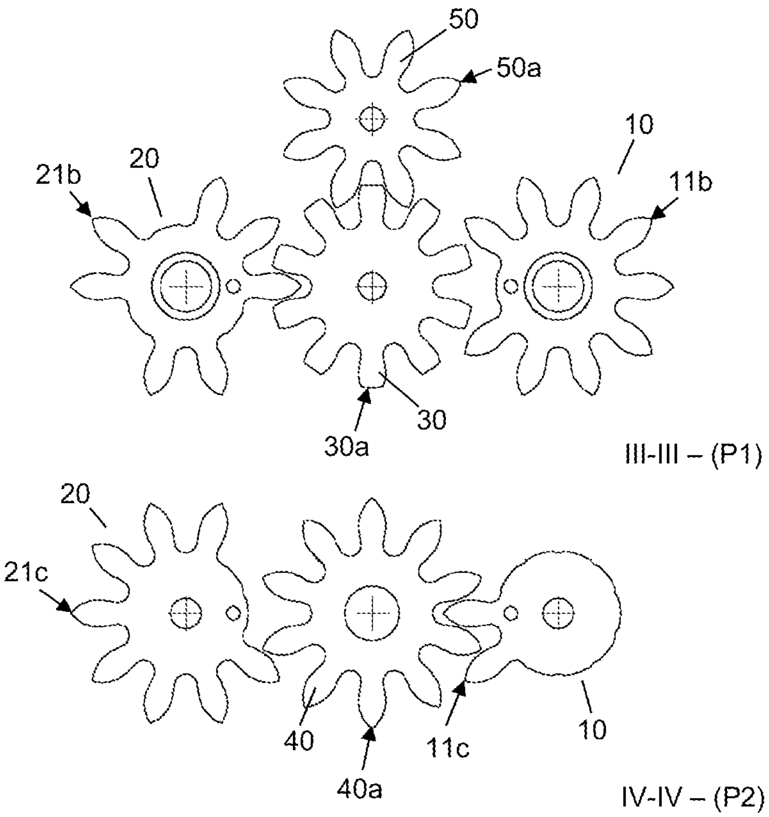
FIG. 6 represents a second variant of the first embodiment of a device for displaying an indication of the time or derived from the time in a sectional view (in two sectional views on the planes III-III and IV-IV in FIGS. 3 and 4).

In a second variant of the first embodiment illustrated in FIG. 6 only the conformation of the second display mobile unit 20 is modified. In this variant the second display mobile unit 20 includes a third toothing 21*b* disposed in the plane P1 having 7 teeth and a fourth toothing 21*c* disposed in the plane P2 having 8 teeth.

The third toothing consists for example of a set of ten teeth equi-angularly distributed about the axis A2, three of which teeth have been removed or not formed. In other words, it is a set of ten teeth of which three teeth are missing. The seven teeth of the third toothing are preferably distributed as follows: three juxtaposed teeth, a space left free by a missing tooth, two juxtaposed teeth, a space left free by a missing tooth, two juxtaposed teeth and a space left free by a missing tooth.

The fourth toothing consists for example of a set of ten teeth equi-angularly distributed about the axis A2, two of which teeth have been removed or not formed. In other words, it is a set of ten teeth of which two teeth are missing. The eight teeth of the fourth toothing are preferably distributed as follows: eight juxtaposed teeth and a space left free by two missing teeth.

This variant has in particular the advantage of offering toothings 21*b* and 21*c* with few missing, removed or not formed teeth, which makes it possible to prevent skewing of the arms 81, 82 and more particularly the arm 82 cooperating with the second mobile unit.

Figure 9:
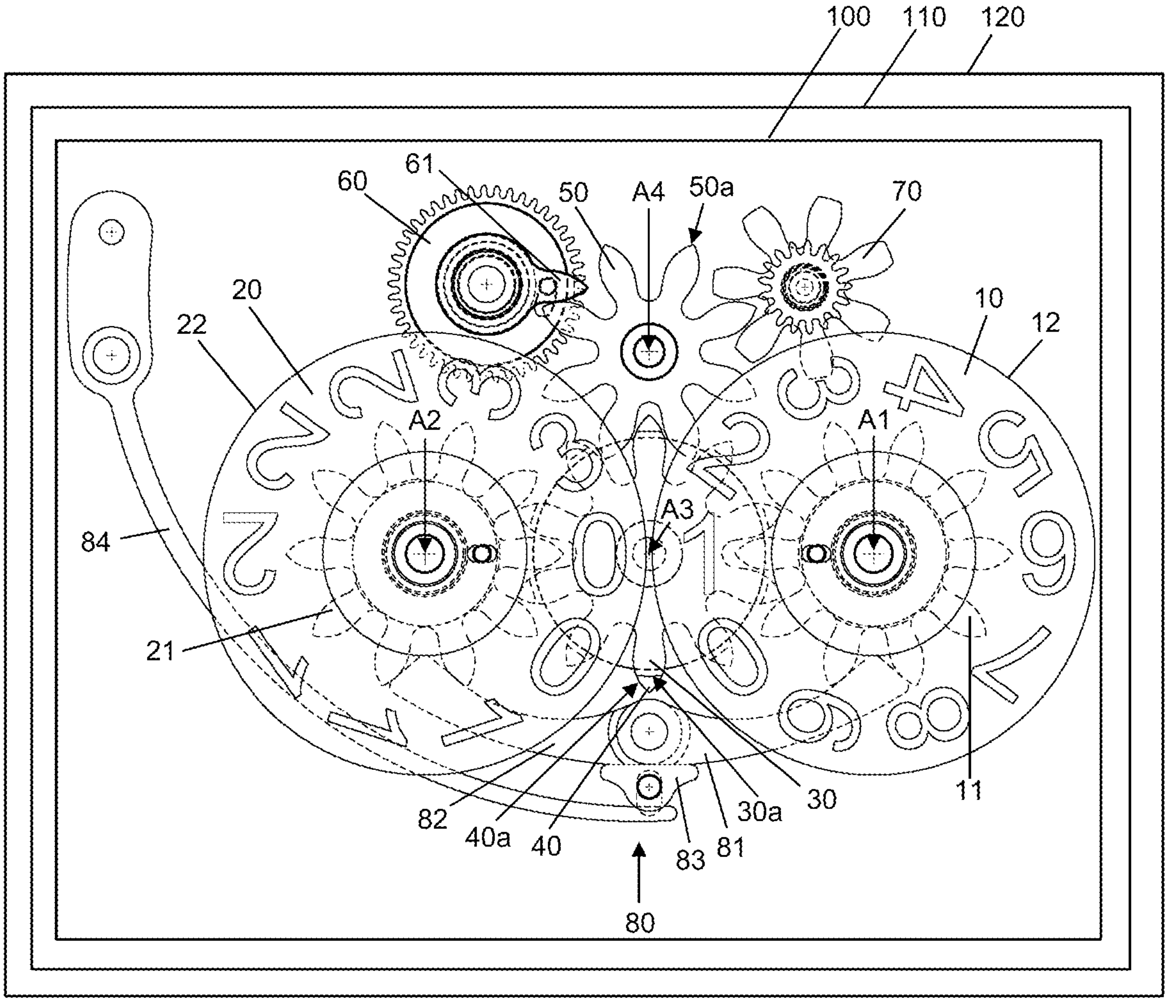
FIG. 9 represents a second embodiment of a timepiece.

A second embodiment of a timepiece 120 is described hereinafter with reference to FIG. 9.

The timepiece 120 is for example a watch, in particular a wristwatch.

The timepiece 120 includes a timepiece movement 110. The timepiece movement is intended to be mounted in a timepiece case in order to protect it from the external environment.

The timepiece movement 110 may be an electronic movement or a mechanical movement, in particular an automatic movement.

The timepiece movement includes a device 100 for displaying an indication of the time or derived from the time. The indication of the time or derived from the time is preferably an indication of the date. Nevertheless, the indication may be of any other kind, in particular a numerical indication on two digits or more such as an indication of the year or an indication of the month or an indication of the hour or an indication of the minute or an indication of the second.

In this second embodiment the display device is for example a "grande date" date display type.

In this second embodiment the display device further includes a correction mobile unit 70 acting on the intermediate mobile unit 50, more particularly on the toothing 50*a*. Alternatively, the correction could also be effected by driving directly the fifth toothing 30*a* of the first command mobile unit 30. The device could further include (substituted for the correction mobile unit 70) an arm used to effect a correction by acting on the mobile unit 50 or on the first command mobile unit 30.

Different design variants are possible for driving the two display disks 12 and 22. All of the variants described here function in accordance with the same sequence of displaying the date, with the same number of teeth on the display mobile units 10 and 20 and on the command mobile units 30 and 40. The only differences between the different variants described are the disposition and the number of teeth provided on the third and fourth toothings of the display mobile unit 20.

Regardless of the embodiment or the variant, the first, third and fifth toothings preferably have substantially the same first primitive diameter.

Regardless of the embodiment or the variant, the second, fourth and sixth toothings preferably have substantially the same second primitive diameter.

Regardless of the embodiment or the variant, the first and second primitive diameters are preferably equal or substantially equal.

Regardless of the embodiment or the variant, the first and second command mobile units 30 and 40 are preferably arranged in a coaxial manner. Nevertheless, it is also possible to dispose them on two distinct axles whilst retaining the same operation of the kinematic chain of the display device.

Regardless of the embodiment or the variant, the first toothing 11*b*, the second toothing 11*c*, the third toothing 21*b* and the fourth toothing 21*c*, along with the fifth toothing 30*a* and the sixth toothing 40*a* of the first and second command mobile units 30 and 40 preferably all have substantially identical profiles and moduli. These six toothings also have the same angular pitch with 10 teeth, missing or not, equi-angularly distributed about their respective axis. However, these features do not constitute a limitation on the functioning of the device. For example, it would be entirely conceivable to have different numbers of teeth on the two display mobile units 10 and 20 in order to follow different successions of digits on the other two display disks 12 and 22. The numbers of digits on the two display mobile units 10 and 20 are not necessarily identical. Likewise, the numbers of teeth on the gears 11 and 21 do not need to be identical.

The numbers of teeth on the two command mobile units 30 and 40 have no influence on the sequencing of the jumps of this device either. The number of teeth of the fifth toothing 30*a* of the first command mobile unit 30 could be different from that of the sixth toothing 40*a* of the second command mobile unit 40.

Regardless of the embodiment or the variant, the number of locations available for arranging teeth on the toothings 11*b*, 11*c*, 21 *b* and 21*c* of the two display mobile units 10 and 20 could also be a multiple of the number of digits indicated on the display disks 12 and 22.

Regardless of the embodiment or the variant, the meshing of the toothings 11*b*, 11*c*, 21*b* and 21*c* of the two display mobile units 10 and 20 could equally be effected with different profiles and/or moduli on the toothings 30*a* and 40*a* of the two command mobile units 30 and 40. For example, the toothings 30*a* and 40*a* could be substantially half the size of the toothings 11*b*, 11*c*, 21*b*, 21*c*.

In other design variants it is possible to have the two display disks 12 and 22 superposed or partly superposed. It is even possible to dispose the two display disks in a coaxial manner. In the case of a coaxial superposition of the display disks the construction of the kinematic chain would then have to be transposed onto four distinct planes instead of two, because the toothings 11*b*, 11*c*, 21 *b* and 21*c* of the two display mobile units 10 and 20 must be coaxial. The kinematic chain would however remain unchanged, because it would still be possible to have a fifth toothing 30*a* of a first command mobile unit 30 meshing with the first and third toothings 11*b* and 21*b* and a sixth toothing 40*a* of a second command mobile unit 40 meshing with the second and fourth toothings 11*c* and 21*c*.

Regardless of the embodiment or the variant, a locking system, in particular a "Maltese cross", could be added to one or more supplementary levels of the display mobile units 10 and 20 or of the command mobile units 30 and 40.

Regardless of the embodiment or the variant, the first command mobile unit 30 may be driven directly by the intermediate mobile unit 50 via the respective toothings 30*a* and 50*a* or by a supplementary level of teeth not represented here.

Regardless of the embodiment or the variant, it is possible to drive the first and second mobile units directly with the first command mobile unit 30 (without recourse to mobile units 50 and 60). To this end the first command mobile unit 30 could comprise a limited number n of teeth, for example one tooth or two teeth or three teeth (equi-angularly distributed), and configured so that a rotation of 1/n revolution occurs every 24 hours. The drive could be of the instantaneous jump type or of the semi-instantaneous jump type or of the trailing type. For example, the mobile unit 30 could include only two diametrically opposite teeth driving the first and second display mobile units 10 and 20 on the line of centers. The command mobile unit would then have to perform a half-turn every 24 hours.

Regardless of the embodiment or the variant, the display of the digit 0 on the tens display disk 22 may be replaced by a gap, that is to say a zone of the disk with no digit. Thus the sequence 0, 0, 1, 1, 1, 2, 2, 2, 3, 3 may be replaced by "gap", "gap", 1, 1, 1, 2, 2, 2, 3, 3.

Regardless of the embodiment or the variant, the timepiece, in particular the movement or the display device, may include a jumper or indexing device 80, in particular a first embodiment of a jumper or indexing device 80 as described hereinafter with reference to FIGS. 9 to 13.

The Jumper or Indexing Device 80 Includes:

- at least one first arm 81 including a first beak 81*a* for positioning a first mobile unit 10,
- at least one second arm 82 including a second beak 82*a* for positioning a second mobile unit 20,
- an element 84 for elastically returning the first arm and the second arm to configurations positioning the first and second mobile units, and
- a lever 83 interfaced between:
  - on the one hand, the elastic return element, and
  - on the other hand, the first and second arms.

The jumper or indexing device 80 enables indexing of the angular position of each of the first and second mobile units, that is to say to definition of a particular angular position among a particular number of stable angular positions, for example 10 positions, for each of the first and second mobile units. Those positions are positions enabling the mobile units to indicate information.

As stated above, the first mobile unit 10 is mobile in rotation about the axis A1 and the second mobile unit 20 is mobile in rotation about the axis A2. The device 80 preferably includes a frame 99 on which the first mobile unit is mounted to be mobile in rotation about the axis A1 and on which the second mobile unit 20 is mounted to be mobile in rotation about the axis A2. The frame may be in particular be a movement blank such as a plate or a calendar ring 99.

The first arm or lever 81 is mounted to pivot relative to the frame 99 about a pivot axis A5 of the first arm.

The Second Arm or Lever 82 is Mounted to Pivot Relative to the Frame 99 about a Pivot Axis A5 of the Second Arm.

Figure 2:
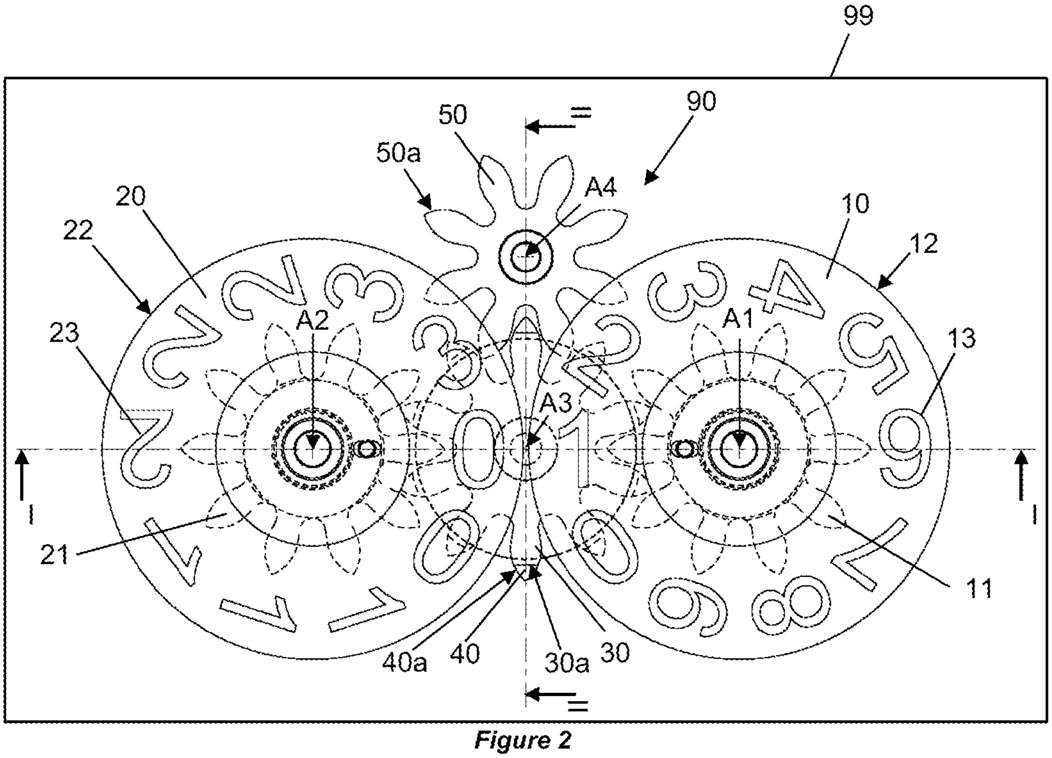
FIG. 2 is a detail view of a first embodiment of a device for displaying an indication of the time or derived from the time.

The first arm or lever 81, in particular the first beak 81*a*, is intended to cooperate with the first toothing 11*b* and second toothing 11*c* of the first gear 11 of the first display mobile unit 10. The second arm or lever 82, in particular the second beak 82*a*, is intended to cooperate with the third toothing 21*b* and the fourth toothing 21*c* of the second gear 21 of the second display mobile unit 20. It is these two arms or levers 81, 82, in particular the beaks thereof, that by interaction with the teeth of the toothings enable angular indexing of the two display mobile units 10 and 20, as represented in FIG. 2.

Figure 10:
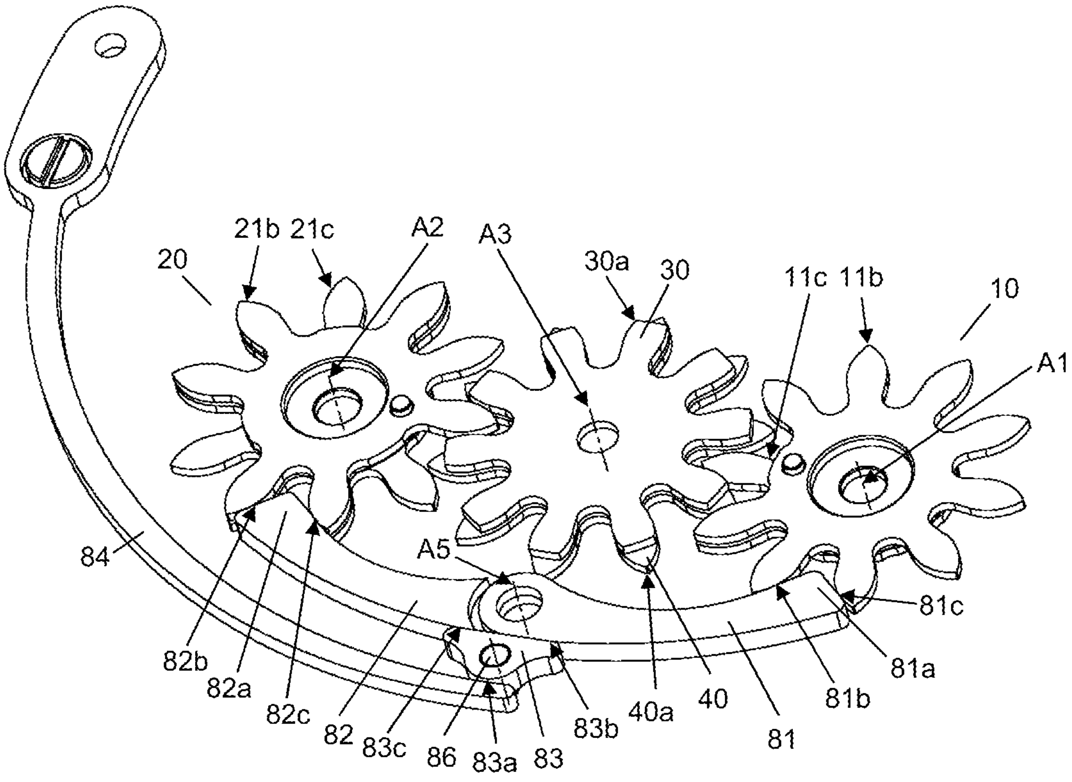
FIG. 10 represents a detail view of a first embodiment of an indexing device.

To be more precise, the indexing of the first display mobile unit 10 is handled by the beak or the head 81*a* that is part of the arm 81. The head 81*a* has two flanks 81*b* and 81*c*. It is the arrangement of these two flanks cooperating by contact with the flanks of successive teeth of the first toothing 11*b* and the second toothing 11*c* that enables angular indexing of the first display mobile unit 10, as illustrated in FIG. 10.

In an analogous manner, the second display mobile unit 20 is indexed by the beak or the head 82*a* that is part of the arm 82. The head 82*a* has two flanks 82*b* and 82*c*. It is the arrangement of these two flanks cooperating by contact with the flanks of successive teeth of the third toothing 21*b* and the fourth toothing 21*c* that enables angular indexing of the second display mobile unit 20, as illustrated in FIG. 10.

The elastic return element 84 enables elastic return of the arms or levers 81 and 82 by means of an interface means 83, such as a lever, that enables transmission and distribution of the force of the elastic return element 84 between the two arms or levers 81 and 82. The interface means is therefore interfaced or disposed between the arm or the levers 81 and 82 and the elastic return element 84. The elastic return element 84 is mechanically connected to the frame 99. For example, the elastic return element 84 is mechanically fixed to the frame 99 at one of its ends. The return element advantageously takes the form of a leaf spring.

The interface means 83 preferably includes a pin 86 that is guided in a groove 85 formed on the frame. Associated with the pin 86, this groove 85 enables the interface means 83 to offer a first degree of freedom in rotation, in particular about an axis parallel to or substantially parallel to the axis A5, and a second degree of freedom in translation relative to the frame perpendicularly to the line of centers defined by the axes A1 and A2 or substantially perpendicularly to the line of centers defined by the axes A1 and A2.

In a variant that is not illustrated the pin may be formed on or fixed to the frame and the groove may be formed in the interface means. In other words, in a variant the structure may be reversed.

The interface means 83 includes in particular a first contact zone 83*a* or 83*a*' cooperating with the elastic return element 84, in particular with a second end of the leaf spring 84, a second contact zone 83*b* or 83*b*' cooperating with the first arm or lever 81 and a third contact zone 83*c* or 83*c*' cooperating with the second arm or lever 82, as represented in FIG. 10.

The spring 84 transmits its return force to the interface means 83 via the first contact zone 83*a* or 83*a*'. This return force is then transmitted to and distributed between the first and second arms 81 and 82 by means of the second and third contact zones 83*b* or 83*b*' and 83*c* or 83*c*' respectively.

A Second Embodiment of a Jumper or Indexing Device 80 is Described Hereinafter with Reference to FIGS. 14 to 16.

The second embodiment of the jumper or indexing device 80 differs from the first embodiment of the jumper or indexing device 80 mainly or only in the geometry of the interface means 83'.

Figure 14A:
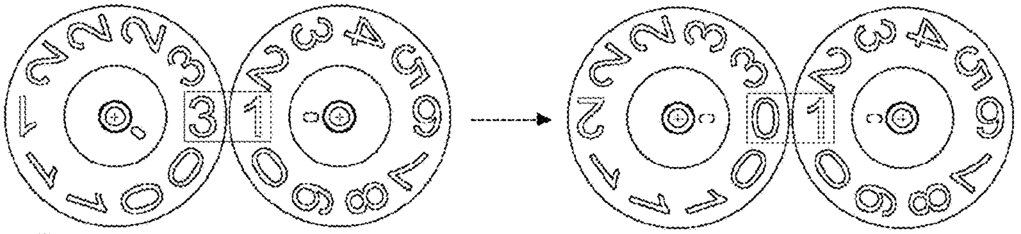
- FIG. 14*a* is a view of the display mobiles illustrating a passage from “31” to “01”
Figure 14B:
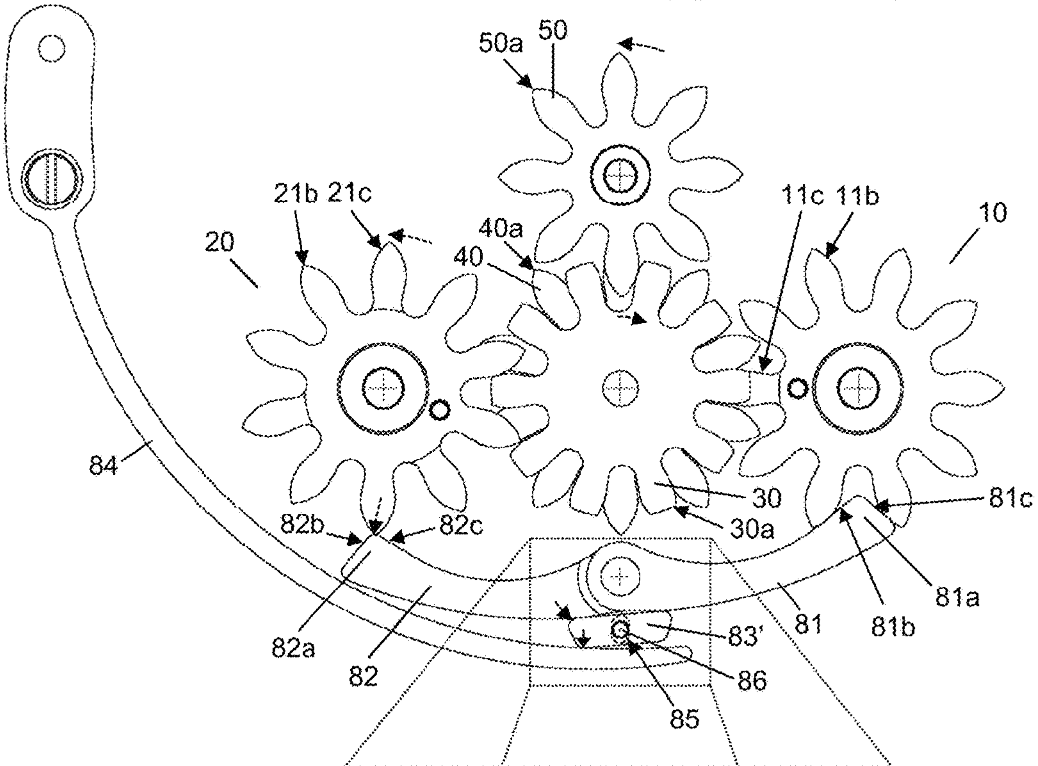
- FIG. 14*b* is a view of the mechanism during the passage from “31 to “01”
Figure 14C:
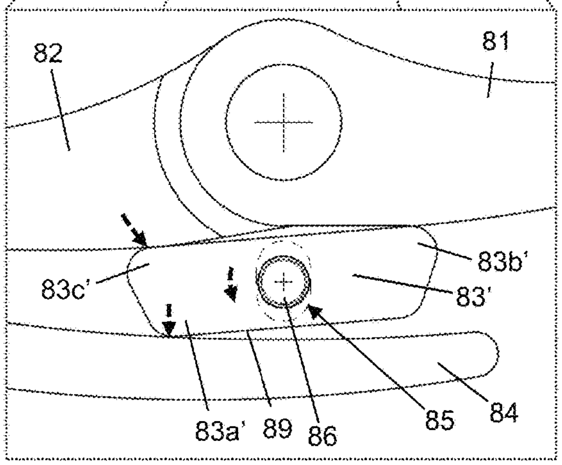
- FIG. 14*c* is an enlarged partial view of the mechanism during the passage from “31” to “01”
Figure 15A:
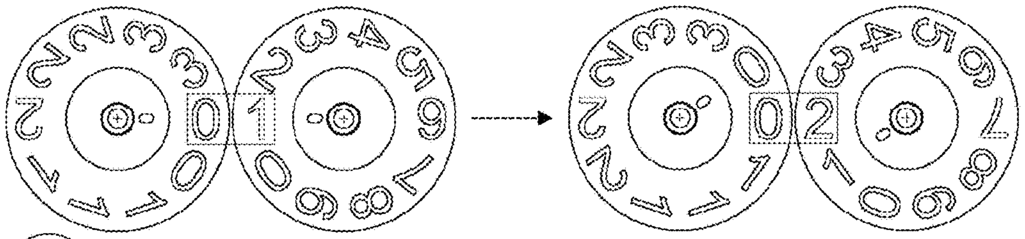
- FIG. 15*a* is a view of the display mobiles illustrating a passage from “01” to “02”
Figure 15B:
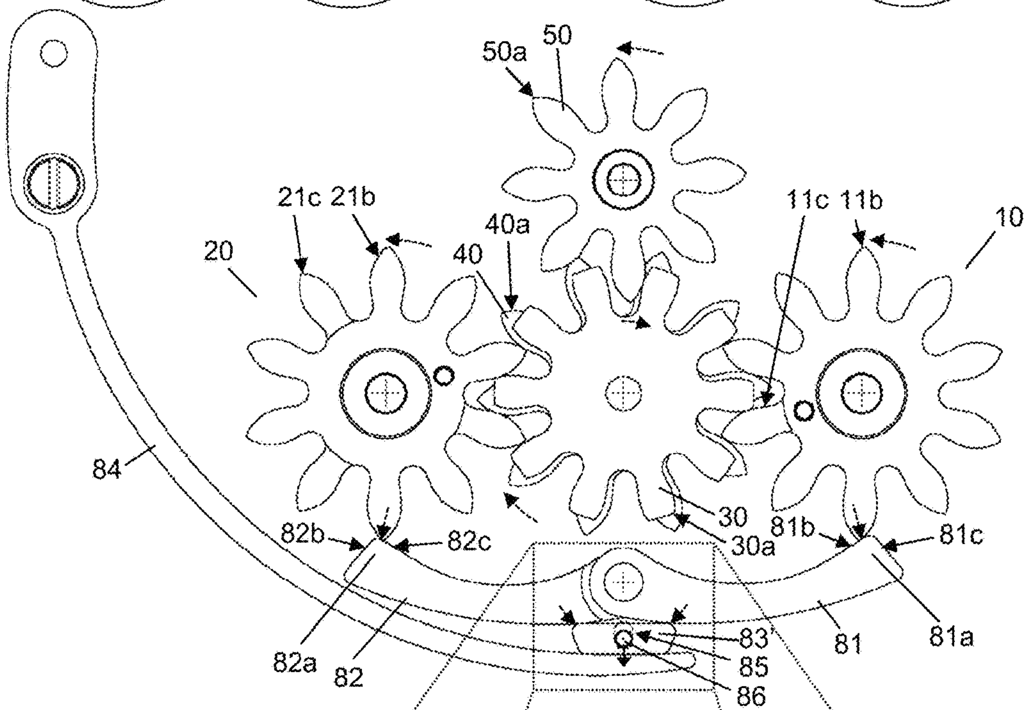
- FIG. 15*b* is a view of the mechanism during the passage from “01” to “02”
Figure 15C:
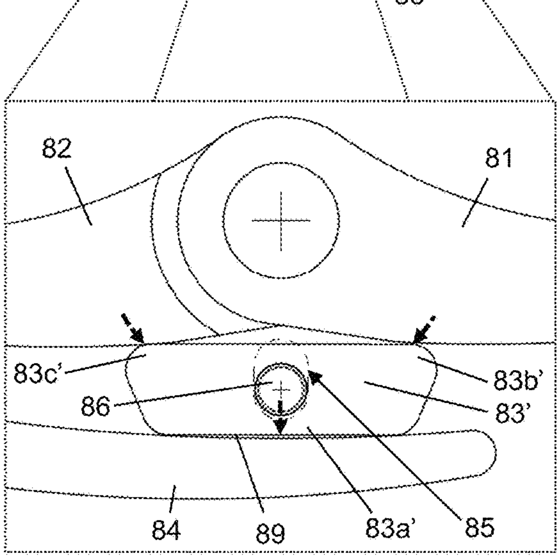
- FIG. 15*c* is an enlarged partial view of the mechanism during the passage from “01” to “02”
Figure 16A:
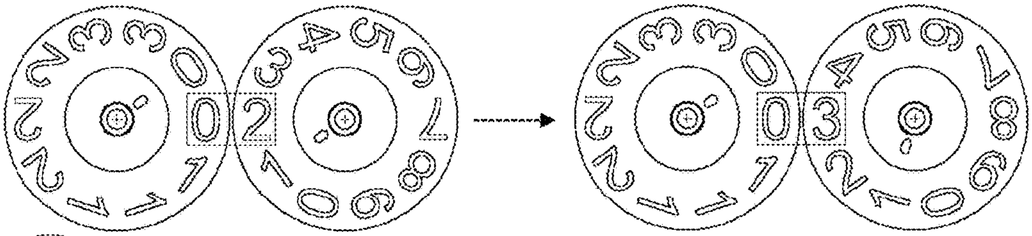
- FIG. 16*a* is a view of the display mobiles illustrating a passage from “02” to “03”
Figure 16B:
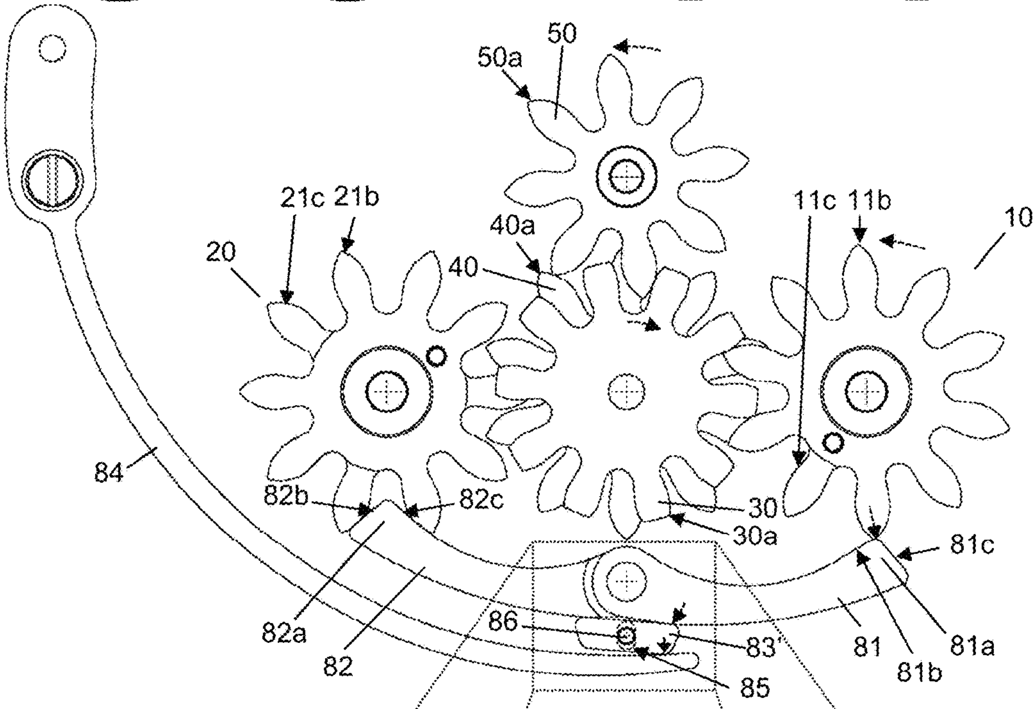
- FIG. 16*b* is a view of the mechanism during the passage from “02” to “03”
Figure 16C:
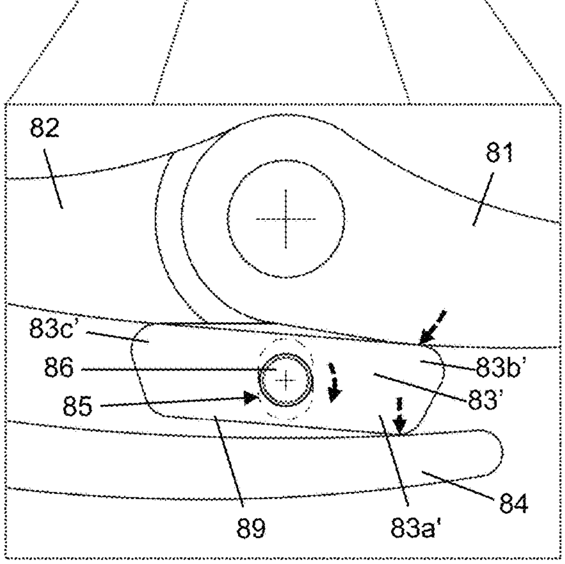
- FIG. 16*c* is an enlarged partial view of the mechanism during the passage from “02” to “03”.

In the second embodiment of the jumper or indexing device 80 the interface means 83' advantageously has a globally rectangular or trapezoidal section in the planes of FIGS. 14 to 16 perpendicular to the axes A1, A2 and A5.

The interface means 83' in particular includes a first contact zone 83*a*' cooperating with the elastic return element 84, in particular with the second end of the leaf spring 84, a second contact zone 83*b*' cooperating with the first arm or lever 81 and a third contact zone 83*c*' cooperating with the second arm or lever 82, as represented in FIGS. 14 to 16.

The first contact zone 83*a*' may extend along a smaller base of the trapezoidal section. This contact zone advantageously constitutes a cam surface 89 adapted to arm the elastic return element 84 when the interface means pivots in rotation about an axis perpendicular to the plane of FIGS. 14 to 16, in particular about the axis of the pin 86. In fact, relative to a rest or neutral position like that represented in FIG. 10 in which the surface 89 would be substantially parallel to the end of the leaf spring 84, in the positions represented in FIGS. 14 and 16 the interface means 83' has moved in translation downward, in the direction of the leaf spring 84, perpendicularly to the axis A5, and has pivoted about the axis of the pin 86. These movements cause a first movement or arming of the elastic return element 84 because of the movement in translation of the interface means 83' and a second movement or arming of the elastic return element 84 because of the rotation of the interface means 83' via the cam surface 89. The cam surface 89 is arranged or conformed so that, in the configurations of FIGS. 14 to 16, the arming of the elastic return element 84 is the same or substantially the same as in the configuration from FIG. 15, where the interface means has moved in translation downward, in the direction of the leaf spring 84, perpendicularly to the axis A5 and without or substantially without pivoting about the axis of the pin 86.

The distribution of the force produced by the elastic return element 84 between the two arms 81, 82 depends on the relative positions of the three contact zones 83*a*, 83*b* and 83*c* or 83*a*', 83*b*' and 83*c*', the geometries adopted for the arms 81, 82 and the elastic return element 84 cooperating with these three contact zones 83*a*, 83*b* and 83*c* or 83*a*', 83*b*' and 83*c*', the geometry and the position of the guiding action of the means 83 or 83' and the relative position between the arms 81 and 82.

In one variant, the first arm and the second arm may consist of the same monobloc or monolithic assembly. In this kind of variant the monobloc or monolithic assembly may be conformed so as to allow a degree of freedom in rotation of the first and second arms about an axis parallel or substantially parallel to or coincident with the axis A5, for example by means of Rod Cluster Control type elastic pivots. The interface means 83 or 83' may equally be part of the monobloc or monolithic assembly and offer a degree of freedom in rotation about an axis parallel to the rotation axis of the first and second arms and a second degree of freedom in translation relative to the frame perpendicularly to the line of centers defined by the axes A1 and A2 or substantially perpendicular to the line of centers defined by the axes A1 and A2, via elastic connections formed to this end. The monobloc or monolithic assembly may include a sub-frame adapted to be fixed to the frame and positioned so that the interface means is able to be in contact with the end of the spring. The proposed mobile units indexing device could therefore be constructed in one or more flexible guidance parts able to combine a plurality of parts and/or functions described in the present document.

Regardless of the variant, the greatest dimension of the interface means 83 or 83' is preferably at least twice or at least three times less than the greatest dimension of the first arm and/or the greatest dimension of the second arm.

In one variant, the geometries of the elastic return element 84, the interface means 83 or 83', the arms 81, 82 and consequently the contact zones 83*a*, 83*b* and 83*c* or 83*a*', 83*b*' and 83*c*' could be modified so as to modify the distribution of the force transmitted to the two arms or levers 81, 82 by the elastic return element 84 via the interface means 83 or 83'. Employing the same logic, these geometric modifications would make it possible to modify the force and/or the variations of force produced by the elastic return element 84 as a function of the number of arms or levers actuated. It is therefore possible to modulate the return force at the level of the levers as a function of the requirements of the design.

In one variant the various degrees of freedom conferred on the interface means could be obtained with no pin or groove. To this end, the interface means 83 or 83' would have to be, for example, guided directly by the arms or levers 81, 82 and/or by the elastic return element 84, the geometries of those components being adapted of course. With this type of design it would even be possible to add a supplementary degree of freedom, for example a second degree of freedom in translation in a plane perpendicular to the axis A5.

In a variant, the pivoting of the arms or levers 81 and 82 could be other than coaxial.

In the variant illustrated in FIG. 10 in particular the two arms or levers 81 and 82 act oppositely to one another relative to the axis A5. However, in an alternative variant these two arm or levers 81 and 82 could be superposed, in particular in the situation where the two display mobile units are superposed or coaxial. In that case the interface means 83 or 83' is advantageously mounted on a pivot connection about an axis parallel to the plane of FIGS. 11 to 13.

In one variant the mobile units indexing device could equally be implemented with arms or levers 81 and 82 functioning in translation. In that case the interface means 83 or 83' is advantageously disposed so as to bear against the ends of the arm or levers 81 and 82 functioning in translation.

In different variants the elastic return element 84 could in particular include one or more blades or be a coil spring, a flexible guide or any other device able to apply a return torque or force. The elastic return element could in particular comprise two leaf springs separated by a portion forming a cam adapted to cooperate with the interface means.

In one variant an intermediate part could be added between the interface means 83 or 83' and the elastic return element 84.

By extension, the indexing device 80 could equally function with more than two arms or levers.

Different situations of actuation of the arms or levers 81, 82 as a function of the various possible sequences at the time of a date jump are explained below.

Thanks to the arrangement and to the conformation of the interface means 83 or 83' the deformation of the elastic return element 84 when the two arms or levers 81, 82 are actuated may here be advantageously equivalent or substantially equivalent to the deformation of the elastic return element 84 when only one of the two arms or levers 81, 82 is actuated. This results in an equivalent or substantially equivalent consumption of energy regardless of the number of arms or levers actuated.

Figure 7:
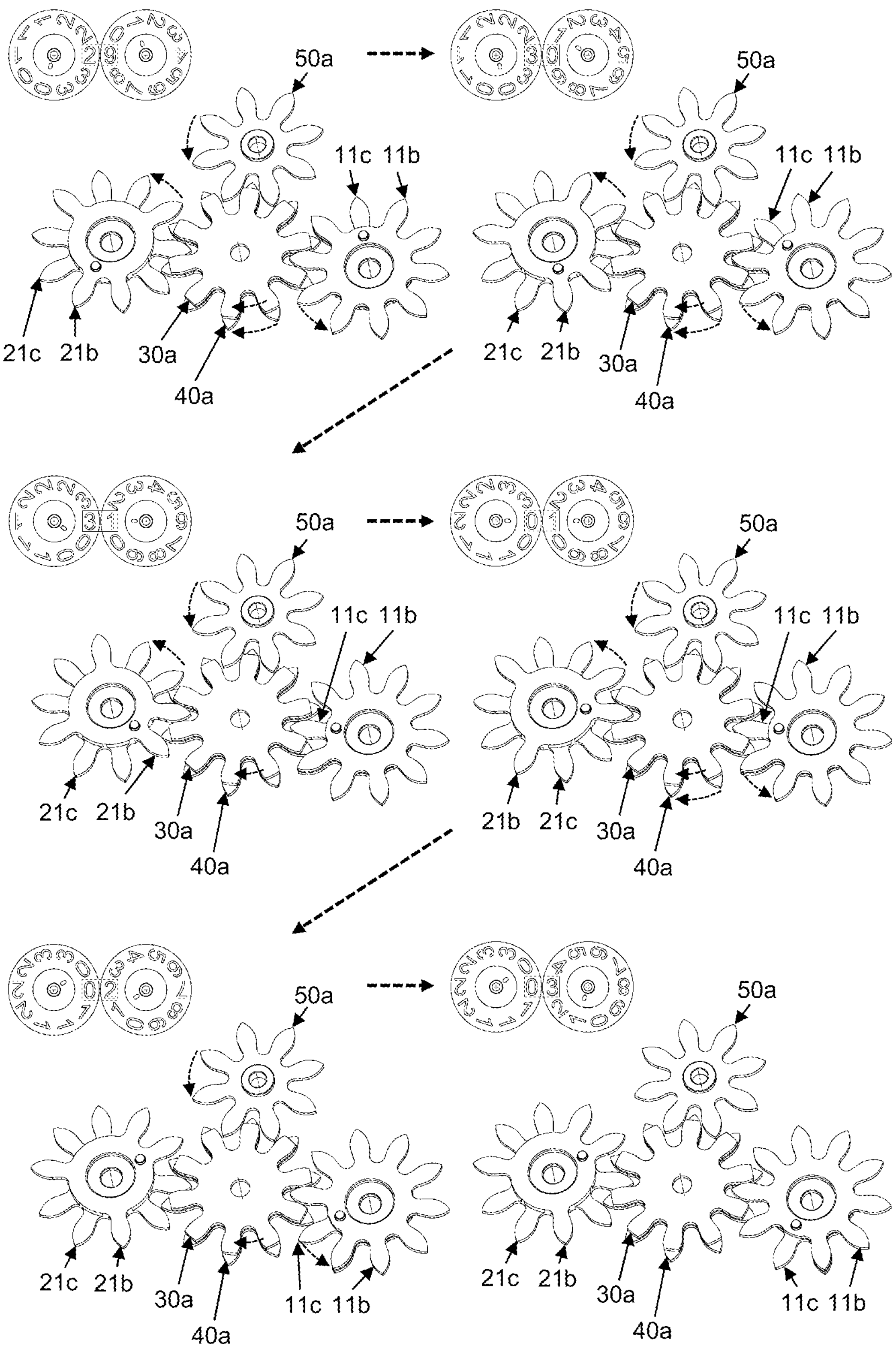
FIG. 7 represents illustrations of the operation of the first variant of the first embodiment of a display device.
Figure 8:
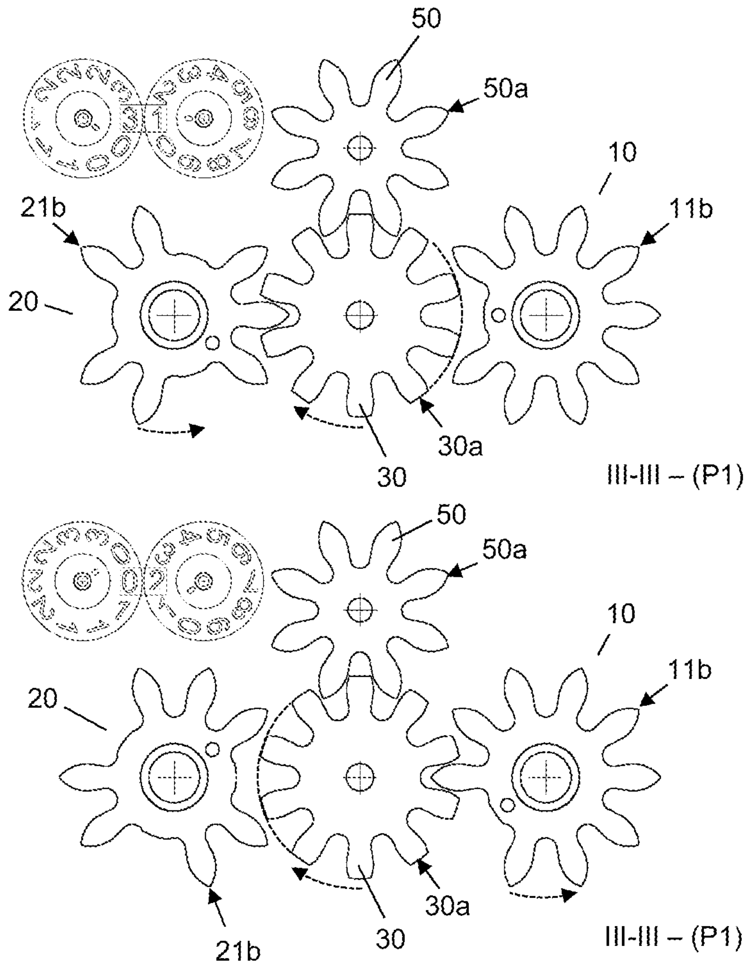
FIG. 8 represents illustrations of the operation of the second variant of the first embodiment of a display device.

One embodiment of a first method for operating a device 100 described above or a timepiece movement 110 described above or a timepiece 120 described above is disclosed hereinafter with reference to FIGS. 7 and 8.

The Method Includes:

- a step of the first command mobile unit 30 driving the first display mobile unit 10, and/or
- simultaneously, a step of the first command mobile unit 30 driving the first display mobile unit 10 and a step of the first display mobile unit 10 driving the second display mobile unit 20 via the second command mobile unit 40, and/or
- a step of the first command mobile unit 30 driving the second display mobile unit 20, and/or
- simultaneously, a step of the first command mobile unit 30 driving the second display mobile unit 20 and a step of the second display mobile unit driving the first display mobile unit 10 via the second command mobile unit 40.

One embodiment of a second method of operating a device 80 described above or a device 100 described above or a timepiece movement 110 described above or a timepiece 120 described above is also disclosed hereinafter with reference FIGS. 11 to 16.

The Method Includes:

- a step of movement of the first arm and/or of the second arm because of the effect of the movement of the first mobile unit 10 and/or of the second mobile unit 20 and a step of arming the elastic return element 84 because of the effect of a movement of the lever 83, 83', and
- a step of restituting of the elastic return element 84 (that is to say a step of restituting elastic potential energy) causing driving in rotation of the first mobile unit 10 and/or of the second mobile unit 20 via the lever 83, 83' and the first arm and/or the second arm, in particular until the first and/or the second mobile unit reaches its next stable or indexed position.

In the Embodiment Described with Reference to FIGS. 14 to 16, the Arming Step Preferably has the Same Intensity in at Least Two of the Following Situations:

- the arming is brought about by a movement of the first mobile unit,
- the arming is brought about by a movement of the second mobile unit,
- the arming is brought about by a movement of the first and second mobile units.

The kinematic chain for driving the display mobile units 10 and 20 by the command mobile units 30 and 40 varies as a function of the date to jump. The various possible situations are explained below, in particular with reference to the first variant of the first embodiment. The diagrams in FIG. 7 enable these various situations to be illustrated.

Passage from “29” to “30”:

The display device indicates “29”. The toothing 50*a* of the intermediate mobile unit 50 effects one step in the anticlockwise direction and drives the fifth toothing 30*a* of the first command mobile unit 30 in the clockwise direction. The fifth toothing 30*a* therefore drives the first toothing 11*b* of the first display mobile unit 10 in the anticlockwise direction. The display of units on the first display disk 12 then passes from the unit “9” to “0”. The fifth toothing 30*a* does not drive the third toothing 21*b* of the second display mobile unit 20. However, as it rotates, the toothing 11*c* of the first display mobile unit 10 drives the sixth toothing 40*a* of the second command mobile unit 40 in turn driving the toothing 21*c* of the second display mobile unit 20. The display of the tens on the second display disk 22 then passes from “2” to “3”.

This driving principle is identical for the passages from “09” to “10” and from “19” to “20”.

Passage from “30” to “31”:

The display device indicates “30”. The toothing 50*a* of the intermediate mobile unit 50 effects one step in the anticlockwise direction and drives the fifth toothing 30*a* of the first command mobile unit 30 in the clockwise direction. The fifth toothing 30*a* therefore drives the toothing 11*b* of the first display mobile unit 10 in the anticlockwise direction. The display of units on the first display disk 12 then passes from the unit “0” to “1”. The fifth toothing 30*a* does not drive the third toothing 21*b* of the second display mobile unit 20. However, as it rotates, the toothing 11*c* of the first display mobile unit 10 drives the sixth toothing 40*a* of the second command mobile unit 40 in turn driving the toothing 21*c* of the second display mobile unit 20. The display of tens on the second display disk 22 then passes to the next digit, that is to say from “3” to “3”, the display “3” being duplicated on the disk 22.

This driving principle is identical for the passages from “10” to “11” and from “20” to “21”, the displays of the “1” and the “2” being also duplicated.

Passage from “31” to “01”:

The display device indicates “31”. The fifth toothing 50*a* of the intermediate mobile unit 50 effects one step in the anticlockwise direction and drives the fifth toothing 30*a* of the first command mobile unit 30 in the clockwise direction. The fifth toothing 30*a* is no longer able to drive the toothing 11*b* of the first display mobile unit 10 because it is facing a missing, removed or not formed tooth. The fifth toothing 30*a* drives the toothing 21*b* of the second display mobile unit 20 in the anticlockwise direction. The tens display of the second display disk 22 then goes to the next tens digit, from “3” to “0”. As it rotates, the toothing 21*c* of the second display mobile unit is not able to drive the second command mobile unit 40 via the sixth toothing 40*a* because here the toothing 21*c* is missing, removed or not formed. The first, units display disk 12 of the first display mobile unit 10 then remains in place.

Figure 11A:
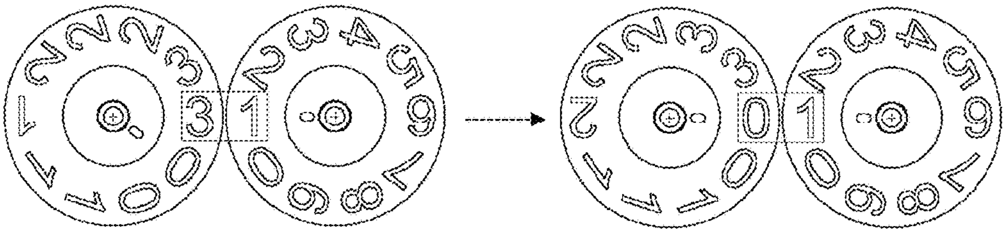
- FIG. 11*a* is a view of the display mobiles illustrating a passage from “31” to “01”
Figure 11B:
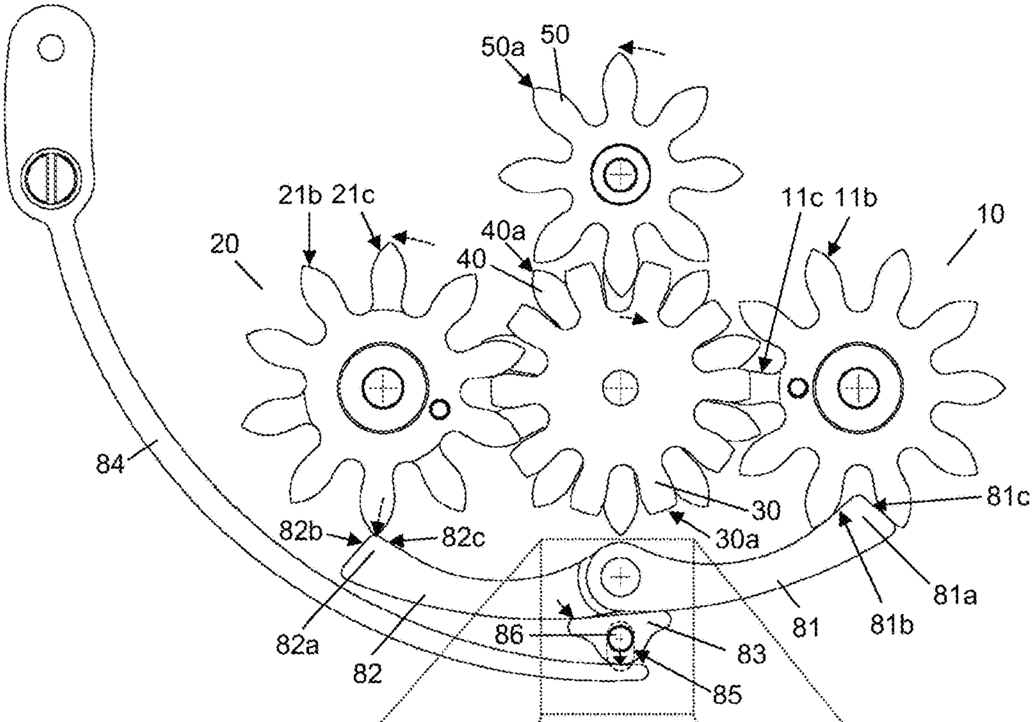
- FIG. 11*b* is a view of the mechanism during the passage from “31 to “01”
Figure 11C:
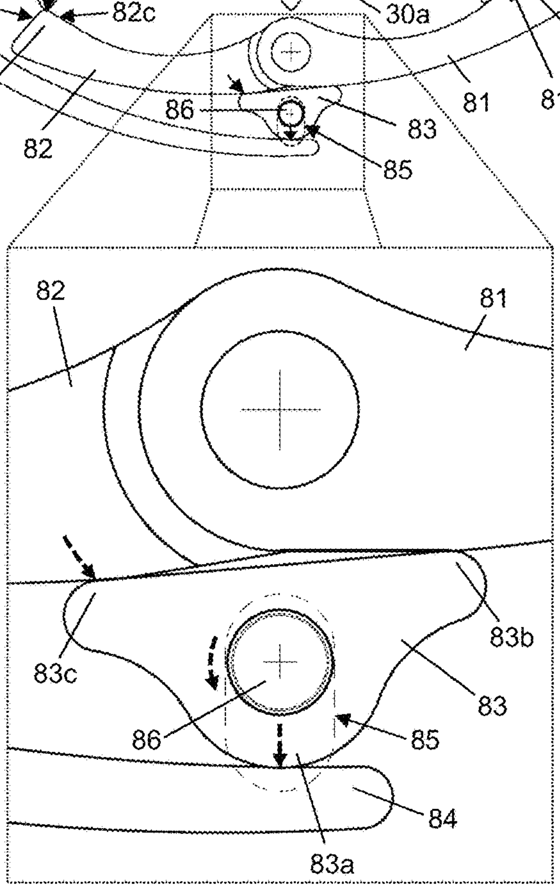
- FIG. 11*c* is an enlarged partial view of the mechanism during the passage from “31” to “01”

On the passage of the date from “31” to “01” as represented in FIGS. 11 and 14 only the second display mobile unit 20 is driven.

In a first phase of actuation of the second arm 82, because of the effect of the rotation of the second display mobile unit 20, the second arm 82 is actuated in a first rotation direction and rises up a tooth of the toothing 21*b* or 21*c*. As it rotates the second arm 82 arms the elastic return element 84 via the interface means 83 or 83'. To be more precise, the second contact zone 83*b* or 83*b*' bearing on the first arm 81 that has remained in place, the interface means 83 or 83' turns and moves in translation in the groove 85 in a first direction of movement because of the mobility where the second arm 82 bears on the third contact zone 83*c* or 83*c'*.

In a second phase of actuation of the second arm 82 that follows on after the summit of the tooth of the toothing 21*b* or 21*c* has been crossed, the second arm 82 is actuated in a second rotation direction and descends the tooth of the toothing 21*b* or 21*c* because of the effect of the re-arming of the elastic return element 84 via the interface means 83 or 83'. The interface means 83 or 83' turns and here moves in translation in a second direction of movement opposite the first direction of movement.

Passage from “01” to “02”:

The display device indicates “01”. The fifth toothing 50*a* of the intermediate mobile unit 50 effects one step in the anticlockwise direction and drives the fifth toothing 30*a* of the first command mobile unit 30 in the clockwise direction. The fifth toothing 30*a* is no longer able to drive the toothing 11*b* of the first display mobile unit 10 because it is facing a missing, removed or not formed tooth. On the other hand, this fifth toothing 30*a* drives the toothing 21*b* of the second display mobile unit 20 in the anticlockwise direction. The tens display of the second display disk 22 then passes to the next digit “0”, the display of the tens digit “0” being duplicated on the disk 22. As it rotates the toothing 21*c* of the second display mobile unit 20 drives the sixth toothing 40*a* of the second command mobile unit in turn driving the toothing 11*c* of the first display mobile unit 10. The units display of the first display disk 12 then passes from the units digit “1” to the units digit “2”.

Figure 12A:
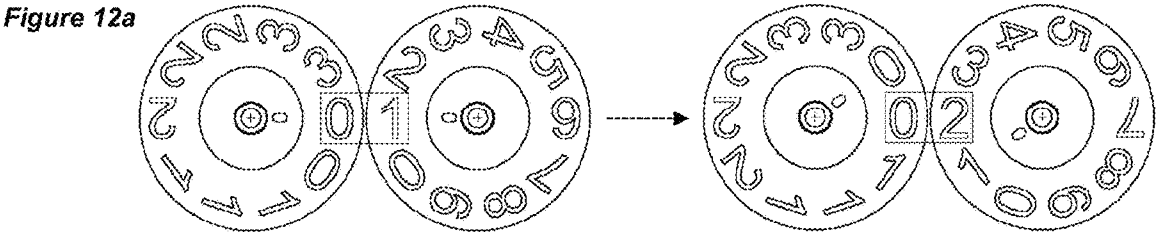
- FIG. 12*a* is a view of the display mobiles illustrating a passage from “01” to “02”
Figure 12B:
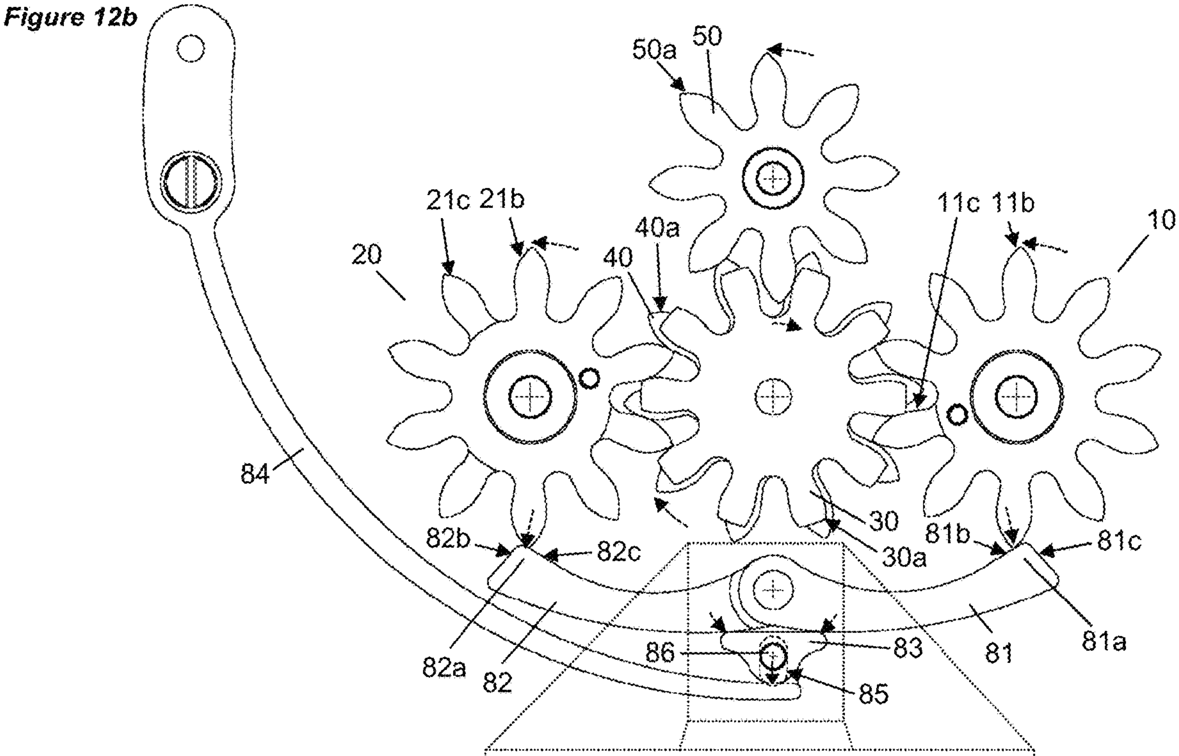
- FIG. 12*b* is a view of the mechanism during the passage from “01” to “02”
Figure 12C:
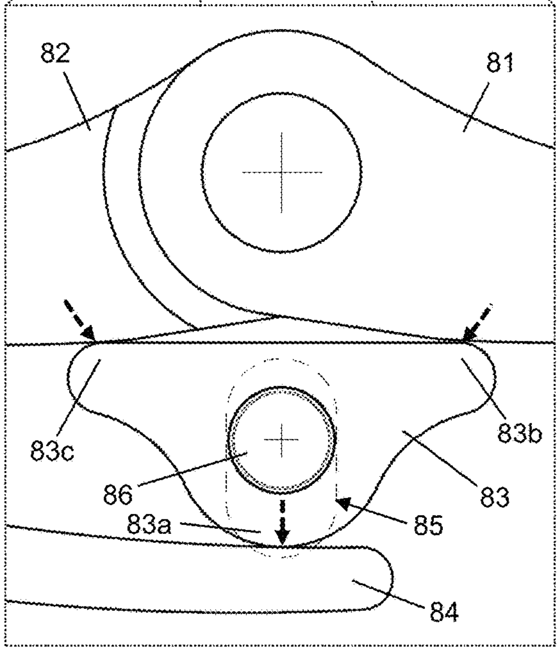
- FIG. 12*c* is an enlarged partial view of the mechanism during the passage from “01” to “02”

Here the two display mobile units 10 and 20 are driven simultaneously, as illustrated in FIGS. 12 and 15.

In a first phase of actuation of the two arms, because of the effect of the rotation of the first and second display mobile units 10 and 20, the first and second arms 81 and 82 are actuated in a first rotation direction respectively rising on teeth of the toothings 11*b* or 11*c* and 21 *b* or 21*c*. As they rotate the first and second arms 81 and 82 arm the elastic return element 84 via the interface means 83 or 83'. To be more precise, the interface means 83 or 83' moves in translation in the groove 85 in a first direction of movement because of the combined effect of the first arm 81 bearing on the second contact zone 83*b* or 83*b*' and the second arm 82 bearing on the third contact zone 83*c* or 83*c*', in such a manner as to arm the elastic return element 84 via the first bearing zone 83*a* or 83*a*'. Here the movement of the interface means 83 or 83' corresponds to a movement in translation or substantially in translation. It is possible for the interface means 83 or 83' to be able to pivot. Nevertheless, this potential movement in rotation is of small amplitude, or even very small amplitude, compared to its movement in translation.

In a second phase of actuation of the two arms that follows on after the summits of the teeth of the toothing 11*b* or 11*c* and 21*b* or 21*c* are crossed, the first and second arms 81 and 82 are actuated in a second rotation direction, descending the teeth because of the effect of the re-arming of the elastic return element 84 via the interface means 83 or 83'. Here the latter moves in translation in a second direction of movement opposite the first direction of movement.

These drive principles are identical for the passage from “11” to “12” and from “21” to “22”, the displays of “1” and “2” also being duplicated.

Passage from “02” to “03”:

The display device indicates “02”. The fifth toothing 50*a* of the intermediate mobile unit 50 effects one step in the anticlockwise direction and drives the fifth toothing 30*a* of the first command mobile unit 30 in the clockwise direction. The fifth toothing 30*a* drives the toothing 11*b* of the first display mobile unit 10 in the anticlockwise direction. The units display on the first display disk 12 then passes to the next unit. On the other hand, the tens are not driven. In fact, the fifth toothing 30*a* is no longer able to drive the toothing 21*b* of the second display mobile unit 20 because it is facing a tooth missing, removed or not formed. Nor is toothing 11*c* of the first display mobile unit 10 able to drive the sixth toothing 40*a* of the second command mobile unit 40 because a tooth of the toothing 11*c* is also missing, removed or not formed here. Because of this, the second command mobile unit 40 and the second display mobile unit 20, more particularly the second display disk 22, remain in place.

Figure 13A:
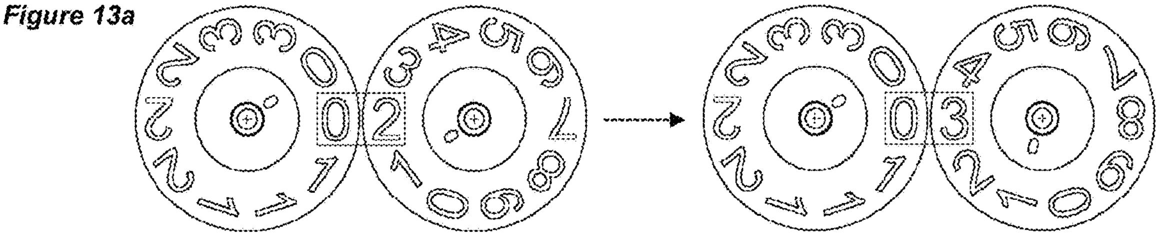
- FIG. 13*a* is a view of the display mobiles illustrating a passage from “02” to “03”
Figure 13B:
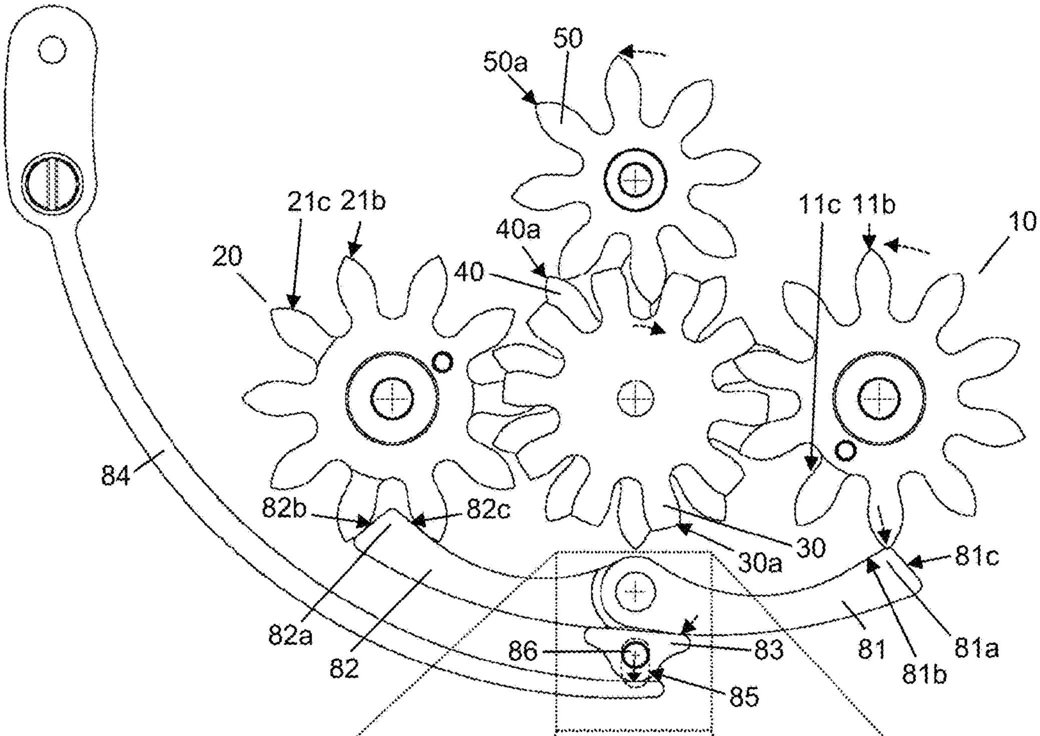
- FIG. 13*b* is a view of the mechanism during the passage from “02” to “03”
Figure 13C:
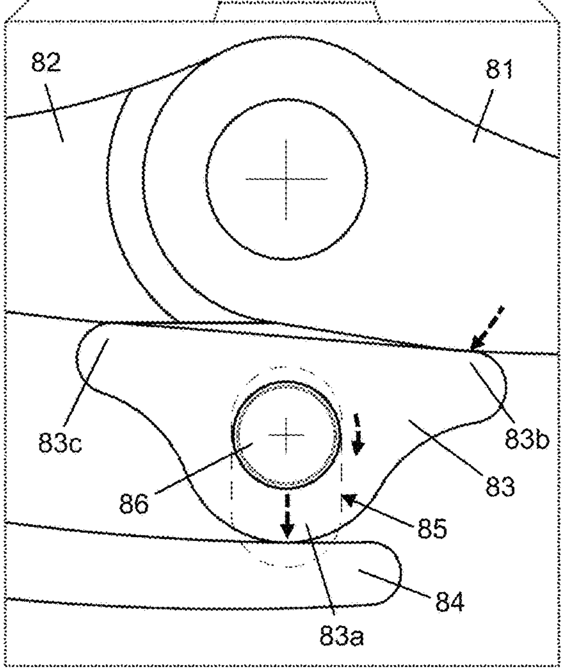
- FIG. 13*c* is an enlarged partial view of the mechanism during the passage from “02” to “03”.

In this instance, only the first display mobile unit 10 is driven, as represented in FIGS. 13 and 16.

In a first phase of actuation of the first arm 81, because of the effect of the rotation of the first display mobile unit 10, the first arm 81 is actuated in a first rotation direction, rising up a tooth of the toothing 11*b* or 11*c*. As it rotates the first arm 81 arms the elastic return element 84 via the interface means 83 or 83'. To be more precise, the third contact zone 83*c* or 83*c*' bearing on the second arm 82 that has remained in place, the interface means 83 turns and moves in translation in the groove 85 in a first direction of movement because of the mobility where the first arm 81 bears on the second contact zone 83*b* or 83*b'*.

In a second phase of actuation of the first arm 81, which follows on after the tooth summit of the toothing 11*b* or 11*c* is crossed, the first arm 81 is actuated in a second rotation direction, descending the tooth of the toothing 11*b* or 11*c* because of the effect of the re-arming of the elastic return element 84 via the interface means 83 or 83'. The interface means 83 or 83' turns and here moves in translation in a second direction of movement opposite the first direction of movement.

These same principles are applicable to the other jumps from “03” to “09”, and for the jumps from “12” to “13” and so on up to “19”, and for the jumps “22” to “23” and up to “29”.

Figure 5:
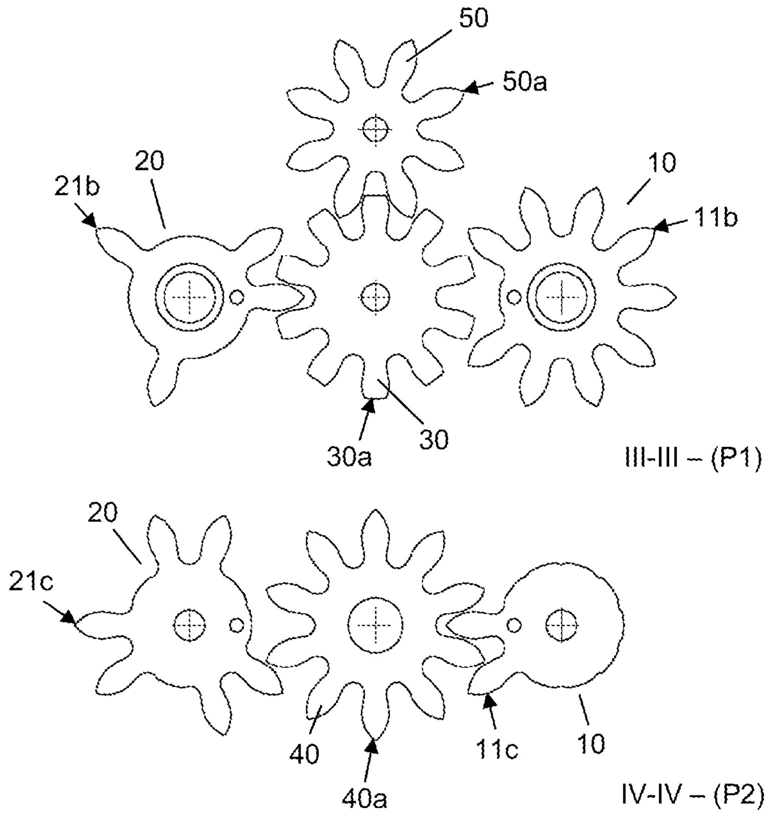
FIG. 5 represents a first variant of the first embodiment of a device for displaying an indication of the time or derived from the time in a sectional view (in two sectional views on the planes Ill-Ill and IV-IV in FIGS. 3 and 4).

As can be seen in FIGS. 5 and 6 and as explained hereinafter with reference to FIG. 8, the teeth of the fifth toothing are preferably clipped. In fact, it is in particular necessary to truncate the end of the toothing 30*a* so that the latter is able to cooperate with the toothings 11*b* and 21*b* only on the line of centers passing through the axes A1 and A2 and so that there is no risk of the latter interfering with the toothings 11*b* and 21*b* away from the line of centers.

Thanks to the solutions described above driving is effected by two distinct command mobile units having substantially the same size as the two gears 11 and 21 of the two display mobile units. The overall size in the plane is then advantageously reduced, whilst offering some flexibility for the arrangement of the display mobile units and for the sequencing of the display.

These solutions also allow greater freedom as to the disposition of the display of the date on the dial, but also in terms of the dimensions of the display disks and therefore in the quality of displaying the date.

These solutions do not involve one large command mobile unit, but rather two distinct command mobile units each taking the form of a small gear in a format equivalent or substantially equivalent to that of the gear fixedly attached to the tens disk and/or to that of the gear fixedly attached to the units disk.

The indexing device proposed here advantageously makes it possible to employ only one return element adapted to return two arms or levers able to function independently of one another or simultaneously. This kind of device is therefore cleverly able to solve the problematic of variations in the energy consumption of the movement linked to the simultaneous or non-simultaneous driving of the two "grande date" display mobile units.

Thanks to the solutions in accordance with the invention the energy consumption of the movement when driving the "grande date" is identical or substantially identical whether there is one or are two display mobile units to be driven. To achieve this, the interface means arranged between the elastic return element and the two arms indexing the two display mobile units may be conformed so as to impart to the end of the elastic return means substantially the same movement in a direction perpendicular to or substantially perpendicular to the line of centers that passes through the axes A1 and A2 in both situations. FIGS. 11 and 13 illustrates a means that moves by a first amount in a direction perpendicular or substantially perpendicular to the line of centers passing through the axes A1 and A2 because of the effect of the movement of the first or second arm. FIG. 12 illustrates a means that moves by a second amount in a direction perpendicular or substantially perpendicular to the line of centers passing through the axes A1 and A2 because of the effect of the simultaneous movement of the first and second arms. In the indexing device represented in FIGS. 11, 12, and 13 the first and second amplitudes are particularly small, so that the difference between these two amplitudes has no significant effect on the energy consumption of movement. Thus the energy necessary to drive the "grande date" mechanism remains identical or substantially identical whether there is one or there are two display mobile units to be driven and is preferably negligible compared to the energy consumed by the timepiece over 24 hours.

Of course, it is entirely possible to conform the first and/or the second arm and/or the interface means so that the second amplitude of movement of the means in a direction perpendicular or substantially perpendicular to the line of centers passing through the axes A1 and A2 to be equal to the first amplitude of movement of the interface means in a direction perpendicular or substantially perpendicular to the line of centers passing through the axes A1 and A2. This kind of conformation is particularly favorable if the stiffness and/or the pre-arming of the spring are increased, in particular with the aim of making the functioning of the indexing device secure. In this case, the energy necessary to drive the "grande date" mechanism remains identical or substantially identical whether there is one or there are two display mobile units to be driven.

Of course, it is entirely possible to conform the first and/or the second arm and/or the interface means so that the amplitude of movements of the interface means in a direction perpendicular or substantially perpendicular to the line of centers passing through the axes A1 and A2 varies as a function of the arm or arms actuated and in particular as a function of the number of arms actuated. Thus the force transmitted to the arm(s) could in particular vary according to the number of arms actuated or according to which arm is actuated.

The timepiece mobiles indexing device solutions could be used in any other device employing a plurality of indexing arms such as, for example, a day-and-date calendar, an annual or semi-perpetual or perpetual date calendar, or a chronograph counting chain.

It could also be used in devices in which the arms would for example serve as a mobile unit brake, clutch clamp or play compensation clamp. Those devices could equally be equivalent to indexing systems.

None of the identified prior art documents discloses an indexing device employing two levers or lever beaks that can be actuated independently of one another or simultaneously cooperating with a single return element the arming level of which is substantially the same whatever the number of beaks actuated. More particularly, none of the identified documents discloses this kind of indexing device for a "grande date" mechanism.

Throughout the present document by "jumper" is preferably meant a position indexing device comprising a beak cooperating with a toothing, in particular with a hollow between two successive teeth of a toothing, to define at least one indexed position of a mobile unit, the beak being urged into the hollow by an elastic element.

Throughout the present document by "toothing" is preferably meant a set of one or more teeth.

Throughout the present document by "mobile unit" is preferably meant an element able to turn about an axis and to effect at least one complete rotation about the axis. The element may comprise a plurality of parts fixedly attached to one another in rotation about the axis. The mobile unit advantageously includes at least one toothing adapted to enable driving of the mobile unit in rotation about the axis, in particular by meshing with another toothing external to the mobile unit.

The invention claimed is:

1. A jumper device for a timepiece device, the jumper device comprising:

at least one first arm including a first beak for positioning a first mobile unit, at least one second arm including a second beak for positioning a second mobile unit, an elastic element for returning the first arm and the second arm to configurations positioning the first and second mobile units, and a lever interfaced between (i) the elastic return element, and (ii) the first and second arms, wherein (i) The First Arm and the Second Arm are Mounted to Move Independently from Each Other, and/or (ii) the lever is mounted to move independently from the first and second arms, and the lever bears on each of the first and the second arm.

2. The jumper device according to claim 1, wherein the jumper device is adapted for indexing the angular position of a first mobile unit mobile in rotation and of a second mobile unit mobile in rotation.

3. The jumper device according to claim 2, wherein the jumper device includes a frame, the first arm is mounted to pivot relative to the frame, and the second arm is mounted to pivot relative to the frame.

4. The jumper device according to claim 2, wherein the jumper device includes a frame and the lever is mounted to be mobile relative to the frame with one degree of freedom in translation and one degree of freedom in rotation.

5. The jumper device according to claim 1, wherein the jumper device includes a frame, the first arm is mounted to pivot relative to the frame, and the second arm is mounted to pivot relative to the frame.

6. The jumper device according to claim 5, wherein the first and second arms are mounted to pivot about a same axis.

7. The jumper device according to claim 5, wherein the jumper device includes a frame and the lever is mounted to be mobile relative to the frame with one degree of freedom in translation and one degree of freedom in rotation.

8. The jumper device according to claim 1, wherein the jumper device includes a frame and the lever is mounted to be mobile relative to the frame with one degree of freedom in translation and one degree of freedom in rotation.

9. The jumper device according to claim 1, wherein a largest dimension of the lever is at most half of (i) a largest dimension of the first arms, and/or (ii) a largest dimension of the second arm.

10. The jumper device according to claim 9, wherein the largest dimension of the lever is at most a third of (i) the largest dimension of the first arm, and/or (ii) the largest dimension of the second arm.

11. The jumper device according to claim 1, wherein the jumper device includes a frame and the jumper device further includes:

- a groove provided on one of the lever and the frame, and
- a pin provided on or fixed to the other of the frame and the lever,
- the groove and the pin cooperating with one another to constitute a mechanical connection having degrees of freedom in translation and in rotation.

12. The jumper device according to claim 1, wherein the elastic return element comprises a spring leaf.

13. The jumper device according to claim 1, wherein the lever or the elastic return element has a cam surface adapted to arm the elastic return element when the lever pivots in rotation.

14. A date display device including a jumper device according to claim 1.

15. The date display device according to claim 14, including a first mobile unit for displaying units and a second mobile unit for displaying tens.

16. The date display device according to claim 14, which is a grande date display device.

17. A timepiece movement including a jumper device according to claim 1.

18. A timepiece including a timepiece movement according to claim 17.

19. A method of operating a device according to claim 1, wherein the method includes:

- moving at least one selected from the group consisting of the first arm and the second arm by an effect of a movement of at least one selected from the group consisting of the first mobile unit and the second mobile unit, and arming the elastic return element by the effect of a movement of the lever, and
- restituting of the elastic return element, causing driving in rotation of at least one selected from the group consisting of the first mobile unit and the second mobile unit by the lever and at least one selected from the group consisting of the first arm and the second arm.

20. The method according to claim 19, wherein the arming has the same intensity in at least two of the following situations:

- the arming is brought about by a movement of the first mobile unit,
- the arming is brought about by a movement of the second mobile unit,
- the arming is brought about by movement of the first and second mobile units.

21. The jumper device according to claim 1, wherein the first arm and the second arm are mounted to move independently from each other.

22. The jumper device according to claim 1, wherein the lever is mounted to move independently from the first and second arms, and the lever bears on each of the first and the second arm.

23. The jumper device according to claim 1, wherein

- (i) the first arm and the second arm are mounted to move independently from each other, and
- (ii) the lever is mounted to move independently from the first and second arms, and the lever bears on each of the first and the second arm.

24. A jumper device for a timepiece device, the jumper device comprising:

- at least one first arm including a first beak for positioning a first mobile unit,
- at least one second arm including a second beak for positioning a second mobile unit,
- an elastic element for returning the first arm and the second arm to configurations positioning the first and second mobile units, and
- a lever interfaced between (i) the elastic return element, and (ii) the first and second arms,
- wherein a largest dimension of the lever is at most half of (i) a largest dimension of the first arm, and/or (ii) a largest dimension of the second arm.

25. The jumper device according to claim 24, wherein the largest dimension of the lever is at most a third of (i) the largest dimension of the first arm, and/or (ii) the largest dimension of the second arm.

26. A date display device including a jumper device, the jumper device comprising:

- at least one first arm including a first beak for positioning a first mobile unit,
- at least one second arm including a second beak for positioning a second mobile unit,
- an elastic element for returning the first arm and the second arm to configurations positioning the first and second mobile units, and
- a lever interfaced between (i) the elastic return element, and (ii) the first and second arms,
- wherein (i) the first mobile unit displays units and the second mobile unit displays tens, and/or (ii) the date display device is a grande date display device.

27. The display device including a jumper device according to claim 26, wherein the first mobile unit displays units and the second mobile unit displays tens.

28. The date display device according to claim 26, which is a grande date display device.

* * * * *